(12) United States Patent
Muirhead

(10) Patent No.: US 10,352,344 B2
(45) Date of Patent: Jul. 16, 2019

(54) TELESCOPING ASSEMBLY

(71) Applicant: Xlocktech Pty Ltd, Larrakeyah (AU)

(72) Inventor: Joshua Muirhead, Larrakeyah (AU)

(73) Assignee: XLOCKTECH PTY LTD, Larrakeyah (AU)

( * ) Notice: Subject to any disclaimer, the term of this patent is extended or adjusted under 35 U.S.C. 154(b) by 140 days.

(21) Appl. No.: 15/551,707

(22) PCT Filed: Feb. 17, 2016

(86) PCT No.: PCT/AU2016/050107
§ 371 (c)(1),
(2) Date: Aug. 17, 2017

(87) PCT Pub. No.: WO2016/131102
PCT Pub. Date: Aug. 25, 2016

(65) Prior Publication Data
US 2018/0031018 A1    Feb. 1, 2018

(30) Foreign Application Priority Data

Feb. 17, 2015    (AU) ................................ 2015900522

(51) Int. Cl.
*F16M 11/32*    (2006.01)
*F16B 7/14*    (2006.01)
*F16M 11/28*    (2006.01)

(52) U.S. Cl.
CPC .............. *F16B 7/1427* (2013.01); *F16B 7/14* (2013.01); *F16M 11/28* (2013.01); *F16M 11/32* (2013.01)

(58) Field of Classification Search
USPC ....................................................... 248/188.5
See application file for complete search history.

(56) References Cited

U.S. PATENT DOCUMENTS

| 5,740,998 | A   | * | 4/1998 | Lindsay  | F16M 11/34 |
|           |     |   |        |          | 248/188.5 |
| 6,361,002 | B1  |   | 3/2002 | Cheng    |           |
| 6,675,674 | B2  |   | 1/2004 | Wang     |           |
| 6,769,654 | B2  | * | 8/2004 | Lindsay  | F16M 11/16 |
|           |     |   |        |          | 248/169   |
| 7,967,259 | B2  | * | 6/2011 | Nakatani | F16B 7/042 |
|           |     |   |        |          | 248/125.8 |
| 8,146,876 | B1  |   | 4/2012 | Young et al. |       |
| 8,528,868 | B2  |   | 9/2013 | Leung    |           |

(Continued)

FOREIGN PATENT DOCUMENTS

GB    2386579 B    8/2004

*Primary Examiner* — Monica E Millner
(74) *Attorney, Agent, or Firm* — Hodgson Russ LLP

(57) ABSTRACT

A telescopic assembly, particularly suited to a tripod or monopod, having a plurality of telescopically arranged tube assemblies. Each tube assembly has a support tube, a locking assembly, and an actuating tube operatively engaged with, and slidably movable within, the locking assembly. The support tube telescopically receives a further locking assembly and an end of a corresponding further support tube of another of the plurality of support tubes and the actuating tube telescopically receives an end of a corresponding further actuating tube of another of the plurality of actuating tubes. Advantageously, all segments of the telescopic assembly can be unlocked, extended or retracted, and locked with a single actuator.

20 Claims, 21 Drawing Sheets

(56) References Cited

U.S. PATENT DOCUMENTS

| | | | |
|---|---|---|---|
| 9,545,714 B2 * | 1/2017 | Lin | B25G 1/04 |
| 2004/0000622 A1 | 1/2004 | Crain et al. | |
| 2006/0138289 A1 * | 6/2006 | Speggiorin | F16M 11/14 |
| | | | 248/163.1 |
| 2008/0283713 A1 * | 11/2008 | Speggiorin | F16B 2/246 |
| | | | 248/439 |

* cited by examiner

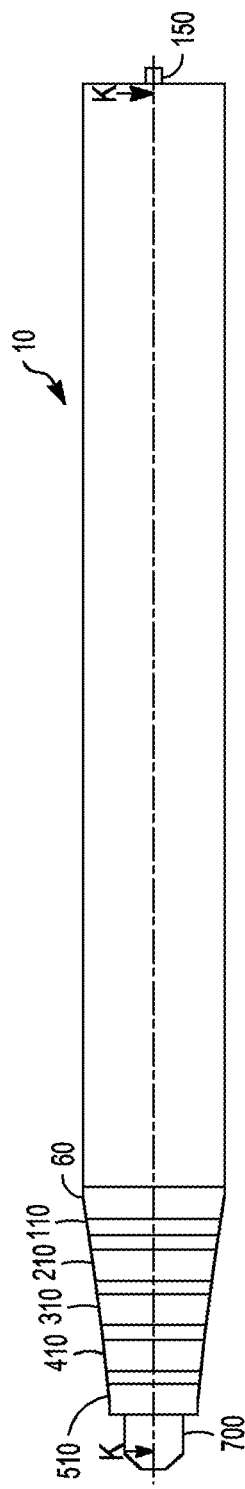
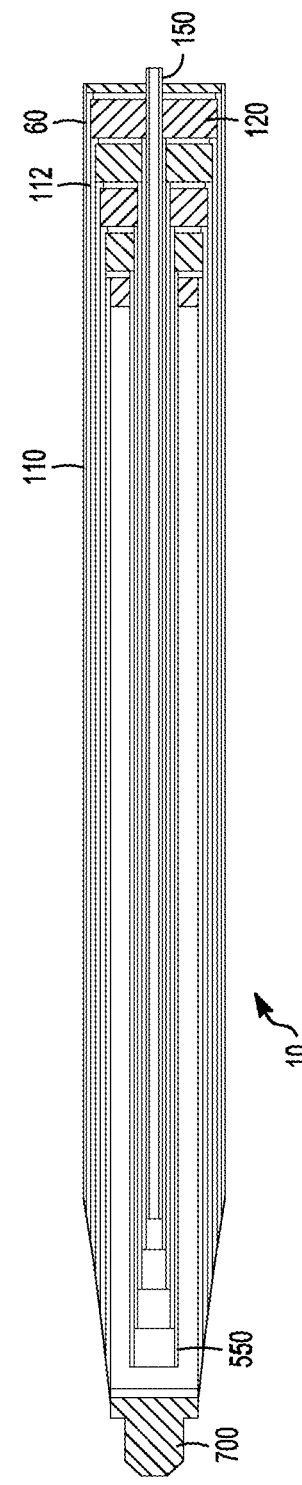
FIG. 1
FIG. 2 (SECTION K-K)

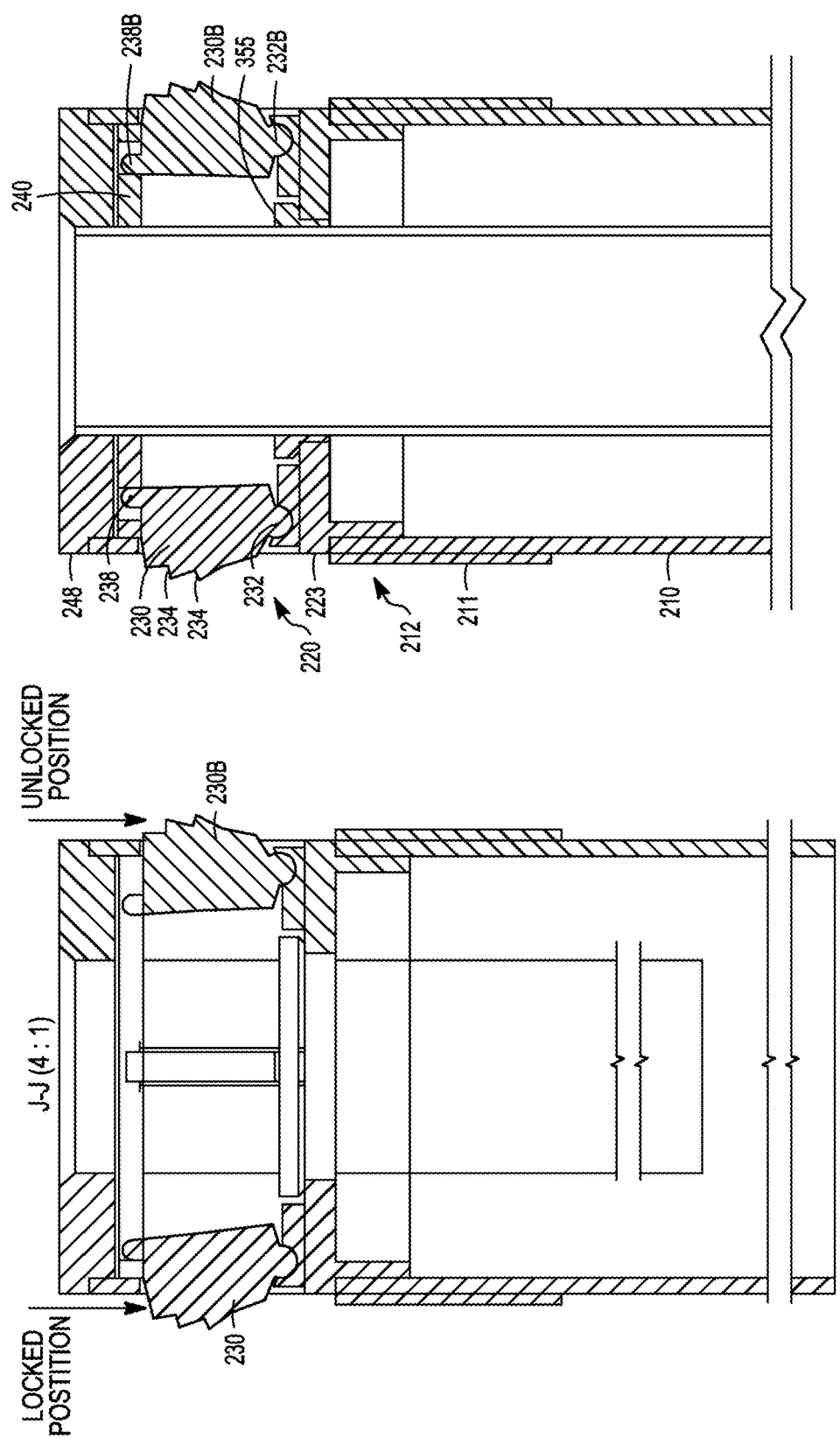

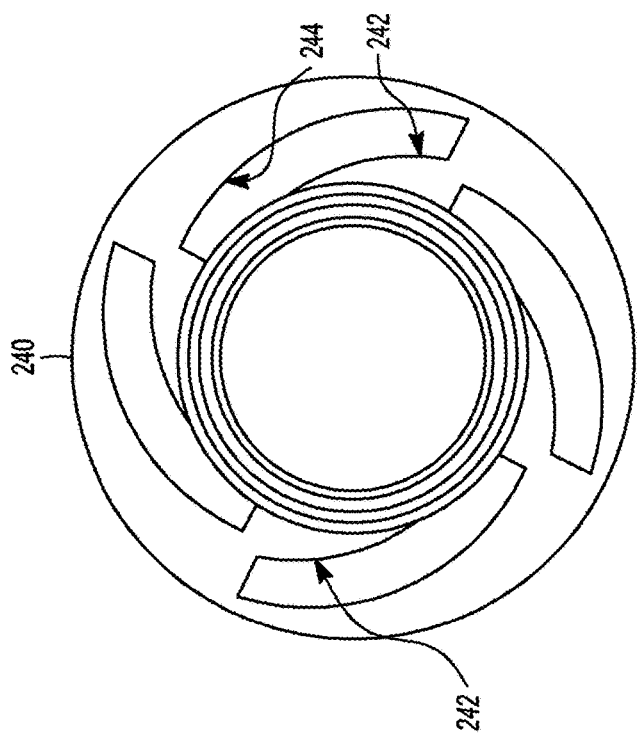
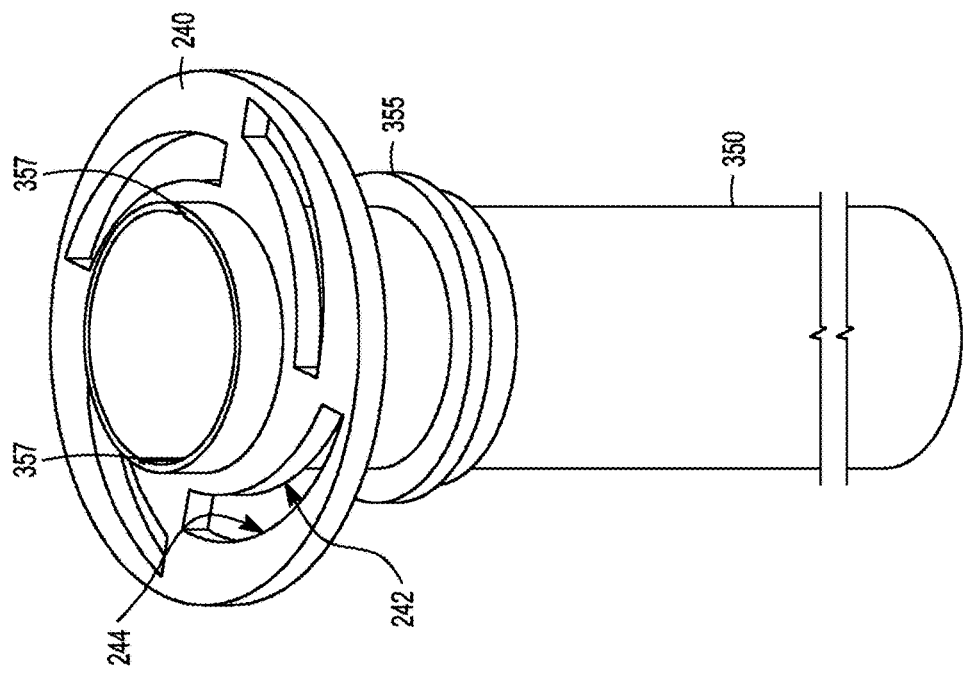
FIG. 8
FIG. 7

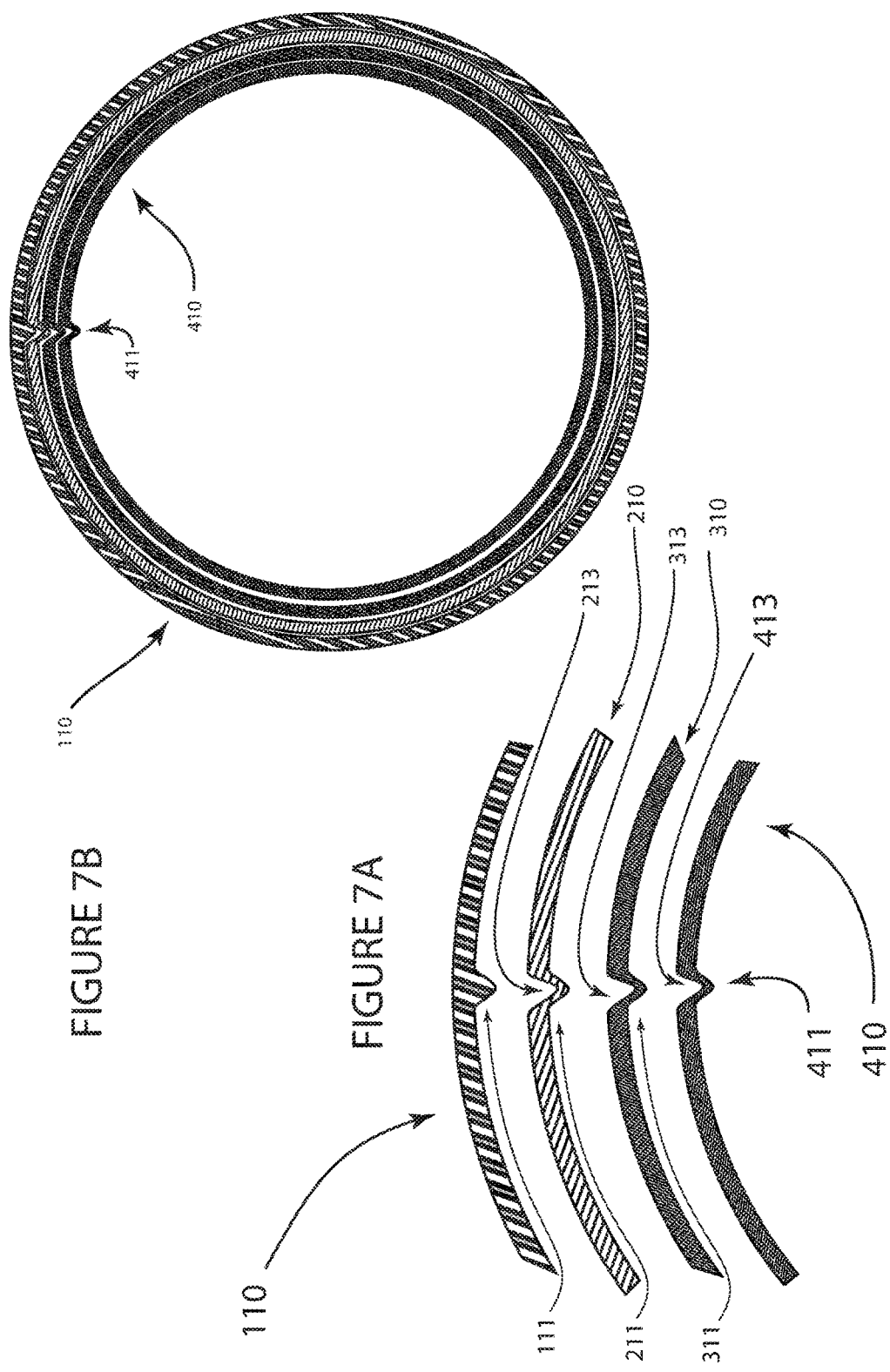

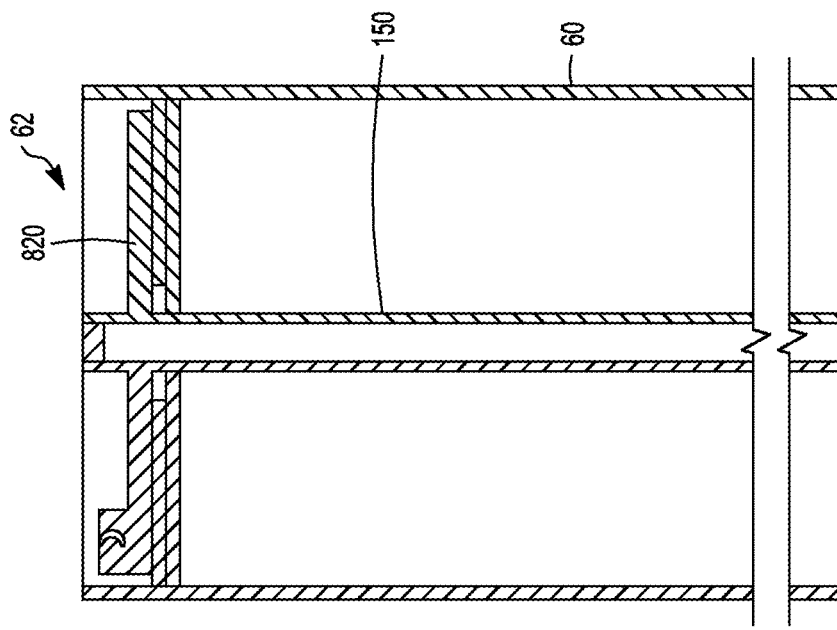
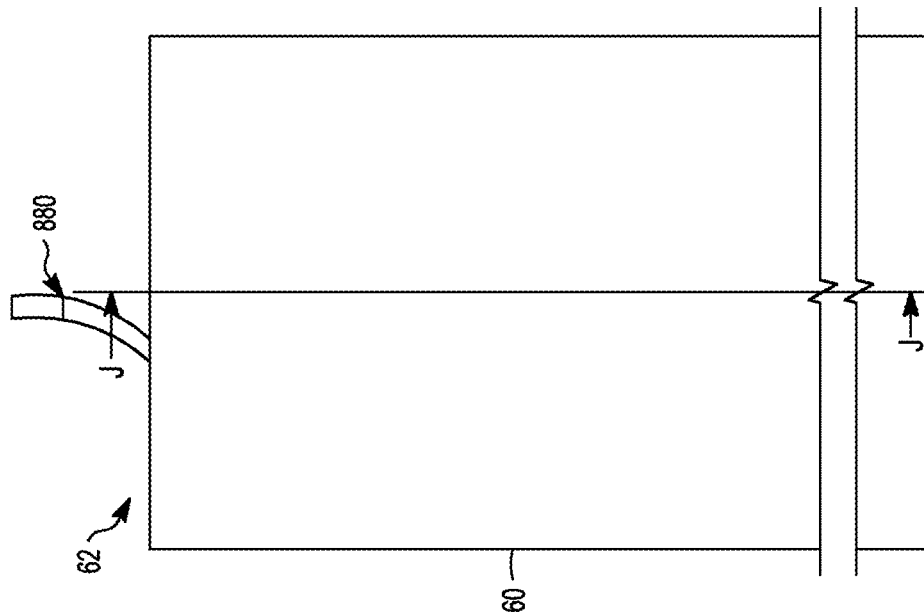

TELESCOPING ASSEMBLY

FIELD OF THE INVENTION

The present invention relates to telescopically extendable assemblies. In particular the invention relates, but is not limited, to telescopically extendable tubes such as those used for tripods, stands, or the like.

BACKGROUND

In many applications, it is desirable to have a telescopic assembly. Typically such telescopic assemblies extend from a collapsed, portable position to an extended position. This allows the assembly to be reduced in size for portability and then extended for use. Some telescopic assemblies can only be locked at one or more particular positions (e.g. when fully extended and/or collapsed) and others are lockable in a range of positions.

With many telescopic assemblies, such as those used for camera tripods for instance, it is necessary to individually release and lock each section of the telescoping legs. Locking mechanisms that control locking and releasing of two sections a telescoping leg simultaneously are known, however, such mechanisms typically suffer from various disadvantages, including weight, awkward or balky operation and inability to work with many (more than two) telescoping sections. Additionally, each leg has its own mechanism that must be operated individually. Furthermore, some known locking mechanisms do not allow locking at any point of extension and are limited to locking at full extension and/or retraction only.

It is an object of the invention to provide a telescoping assembly that overcomes at least some of the problems referred to above or that at least offers the public a useful choice.

SUMMARY

According to an aspect of the invention, there is provided a telescopic assembly including a plurality of telescopically arranged tube assemblies, each tube assembly including:

a support tube;

a locking assembly mounted at or towards an end of the support tube; and an actuating tube operatively engaged with, and slidably movable within, the locking assembly;

wherein the support tube is adapted to telescopically receive a further locking assembly and an end of a corresponding further support tube of another of the plurality of support tubes, and wherein the actuating tube is adapted to telescopically receive an end of a corresponding further actuating tube of another of the plurality of actuating tubes.

In one form, the support tube internally telescopically receives a locking assembly and an end of a corresponding support tube of another of the plurality of support tubes and the corresponding actuating tube externally telescopically receives an end of a corresponding actuating tube of another of the plurality of actuating tubes.

In one form, the support tubes have a circular cross section. The circular cross section is preferably keyed. In other forms, the support tubes may have an oval, triangular, square, rectangular, pentagonal, hexagonal, or octagonal, or other regular or irregularly shaped cross section.

In one form, the actuating tubes have a non-circular cross section. In other forms, the actuating tubes have a circular cross section that is keyed with at least one notch and/or protrusion. In such forms the actuating tube and further actuating tube are substantially prevented from rotating with respect to one another.

In one form, the actuating tubes are mutually arranged to prevent relative rotation and to allow the transmission of torque from one actuating tube to another actuating tube.

In one form, each locking assembly is mounted to the same relative end of its respective support tube so as to prevent relative rotation.

In one form, each locking assembly includes a cam and a cam follower. In one form, at least a portion of the cam and cam follower are shaped to substantially complement each other. In one form the cam may include a recess and the cam follower may include a protrusion received by the recess of the cam. In another form the cam may include a protrusion and the cam follower may include a recess that receives the protrusion of the cam. The recess is preferably in the form of a slot or groove. In one form a helical ridge of the cam or cam follower corresponds to a helical slot or groove of the cam follower or cam, respectively. In a preferred embodiment, each Cam has a slightly different pitch to compensate for increased play down the leg.

In one form, the actuating tubes and cams are mutually arranged such that they are rotatable together.

In one form, each locking assembly includes a clamp, the clamp being actuatable by a respective cam follower.

In one form, the cam follower and the clamp are integrally formed. In such a form the cam follower preferably includes a protrusion or recess formed on or in the clamp. In one preferred form, the cam follower includes a helical ridge integrally formed with the clamp. In one form, the cam follower may comprise a ball bearing.

In one form, the cam and the actuating tube are integrally formed. In such a form, the cam preferably comprises a recess shaped to receive at least a portion of the cam. In one preferred form, the cam includes a helical slot or groove.

In one form, the clamp is movable by the cam between an unlocked position and a locked position. In one form, the clamp is movable along a longitudinal axis of the actuating tube. In one form, at least a portion of the clamp is movable outwardly, preferably substantially perpendicularly, to a longitudinal axis of the actuating tube. In one form, at least a portion of the clamp is resiliently flexible.

In one preferred form, the clamp is configured such that it is movable along a longitudinal axis of the actuating tube by the cam, between the unlocked and locked positions, causing the clamp to engage with an adjacent inclined surface that moves a portion of the clamp perpendicularly to the longitudinal axis of the actuating tube.

In one form, in the locked position, the clamp engages an inside surface of the support tube. In such a form, in the locked position, a portion of the clamp preferably frictionally engages with an inside surface of the support tube. In another form, a portion of the clamp may operatively engage with one or more formations on an inside surface of the support tube.

In one form, the telescopic assembly further comprises an actuator. In one form, the actuator is operatively engaged with at least one actuating tube. In one form, the actuator comprises a trigger. In one form, the trigger comprises a handle. In another form, the trigger comprises a button.

In one form, the telescopic assembly further comprises a biasing assembly. In one form the biasing assembly is operatively engaged with the actuator. In one form the biasing assembly comprises a spring. In one form the spring is a leaf spring. In another form, the spring is a coil spring.

In another form, the spring is a torsion spring. In another form, the spring is a flat coil spring.

In one form, the telescopic assembly forms part of a tripod. In another form, the telescopic assembly forms part of a stand. In another form, the telescopic assembly forms part of a handle. In another form, the telescopic assembly forms part of a prop.

According to another aspect of the invention, there is provided a tripod or stand comprising three telescopic assemblies as hereinbefore described. In such a form, a single actuator is preferably operatively engaged with all three telescopic assemblies.

According to another aspect of the invention, there is provided a method of arranging a telescopic assembly, the method comprising the steps of:

activating a single actuator;

releasing a plurality of telescopically arranged tube assemblies, such that they can move longitudinally relative to each other, in response to the actuator being activated;

extending at least one telescopically arranged tube assembly relative to another;

deactivating the single actuator; and locking the plurality of telescopically arranged tube assemblies, such that they cannot move longitudinally relative to each other, in response to the actuator being deactivated.

In one form, the method preferably further comprises the step of resting a foot of the telescopic assembly on a surface. In one form, this step is preferably performed after releasing the plurality of telescopically arranged tube assemblies and before locking the plurality of telescopically arranged tube assemblies.

In one form, the method preferably further comprises the steps of:

activating a single actuator;

releasing a plurality of telescopically arranged tube assemblies, such that they can move longitudinally relative to each other, in response to the actuator being activated;

retracting at least one telescopically arranged tube assembly relative to another;

deactivating the single actuator; and locking the plurality of telescopically arranged tube assemblies, such that they cannot move longitudinally relative to each other, in response to the actuator being deactivated.

According to another aspect of the invention, there is provided a method of setting up a tripod or a stand having a plurality of telescopic assemblies, the method comprising the steps of:

locating the tripod or stand above a surface by which the tripod or stand assembly is to be supported;

activating a single actuator;

releasing a plurality of telescopically arranged tube assemblies of each telescopic assembly, such that the telescopically arranged tube assemblies can move longitudinally relative to each other, in response to the actuator being activated;

extending at least one telescopically arranged tube assembly relative to another;

deactivating the single actuator; and locking the plurality of telescopically arranged tube assemblies, such that they cannot move longitudinally relative to each other, in response to the actuator being deactivated.

In one form, the method preferably further comprises the step of engaging a foot of each telescopic assembly with the surface. In such a form, this step is preferably performed after releasing the plurality of telescopically arranged tube assemblies and before locking the plurality of telescopically arranged tube assemblies. In such a form, the method preferably comprises the step of levelling the tripod before deactivating the single actuator.

In one form, preferably the step of extending at least one telescopically arranged tube assembly relative to another comprises using gravity to extend the telescopically arranged tubes under their weight.

In one form, the actuator is preferably activated by moving a trigger. In one form, the actuator is preferably activated by depressing a trigger. In such a form, the actuator is preferably deactivated by releasing the trigger. In another form, the actuator may be activated by releasing the trigger and deactivated by depressing the trigger.

In one form, the step of extending/retracting at least one telescopically arranged tube assembly relative to another preferably comprises using a differential fluid pressure to extend/retract the telescopically arranged tubes.

BRIEF DESCRIPTION OF DRAWINGS

Embodiments of the present invention will be discussed with reference to the accompanying drawings wherein:

FIG. 1 is a side view of a telescopic assembly according to the invention;

FIG. 2 is a cross-sectional view through section lines K-K of the telescopic assembly of FIG. 1;

FIG. 6A is a similar view to that of FIG. 6, but shows a clamp on the left hand side in a locked position and a clamp on the right side in an unlocked position;

FIG. 6B is a similar view to that of FIG. 6;

FIG. 7 is an isometric view of a portion of the actuating tube and cam shown in FIGS. 6B and 6C;

FIG. 7A is close up sectional view of keyed tubes;

FIG. 7B is a sectional view of keyed tubes;

FIG. 8 is a top view showing a cam mounted to the actuating tube shown in FIGS. 6B and 6C;

FIG. 9 is a side view of an upper portion of an actuating tube which connects to the right hand of the assembly shown in FIG. 3;

FIG. 10 is a cross-sectional view taken through section lines J-J on FIG. 9;

DESCRIPTION OF EMBODIMENTS

In the below description of an embodiment of the invention, the proximal end is the end nearest the operator (such as the operator 5 shown in FIG. 14). Where the embodiment of the invention is a camera tripod, the proximal end will be the upper end. The distal end is the end furthest the operator. Where the embodiment of the invention is a camera tripod, the distal end will be the lower end.

Figure 3:
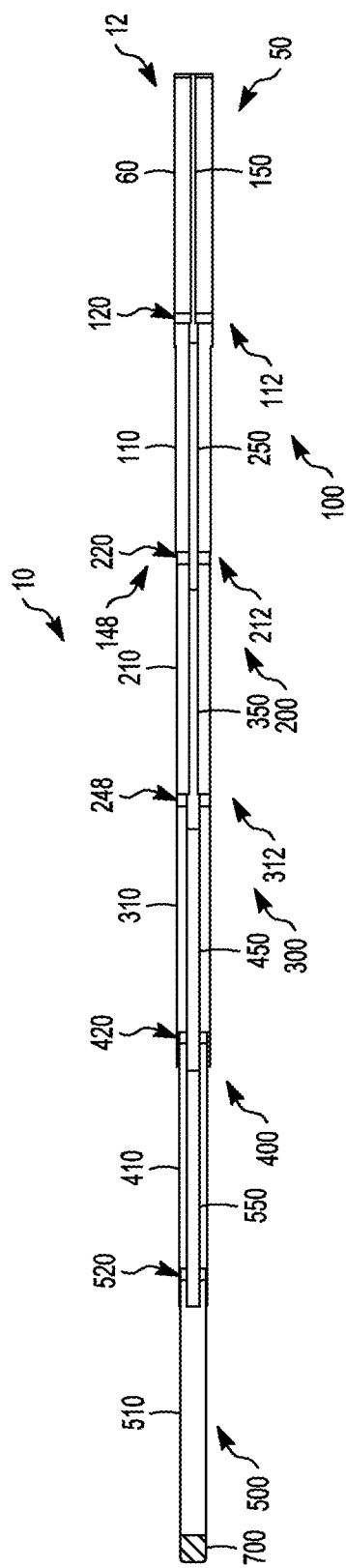
FIG. 3 is a diagrammatic cross-sectional view, similar to that of FIG. 2, but showing the telescopic assembly in an extended (telescoped out) condition.

Referring to FIGS. 1, 2 and 3, a telescopic assembly 10 including a plurality of telescopically arranged tube assemblies 100, 200, 300 and 400 are shown. Each tube assembly includes a support tube, as is illustrated in FIG. 1. Specifically, FIG. 1 shows support tubes 110, 210, 310, and 410. FIG. 2 taken through section line K-K on FIG. 1 shows that each tube assembly also includes a locking assembly and an actuating tube. For instance, tube assembly 100 includes a support tube 110, a locking assembly 120 mounted to a proximal end 112 of the support tube and an actuating tube 150. FIGS. 2 and 3 also show a support tube 510 having a foot 700 in the form of a rubber or plastic stopper.

Figure 4:
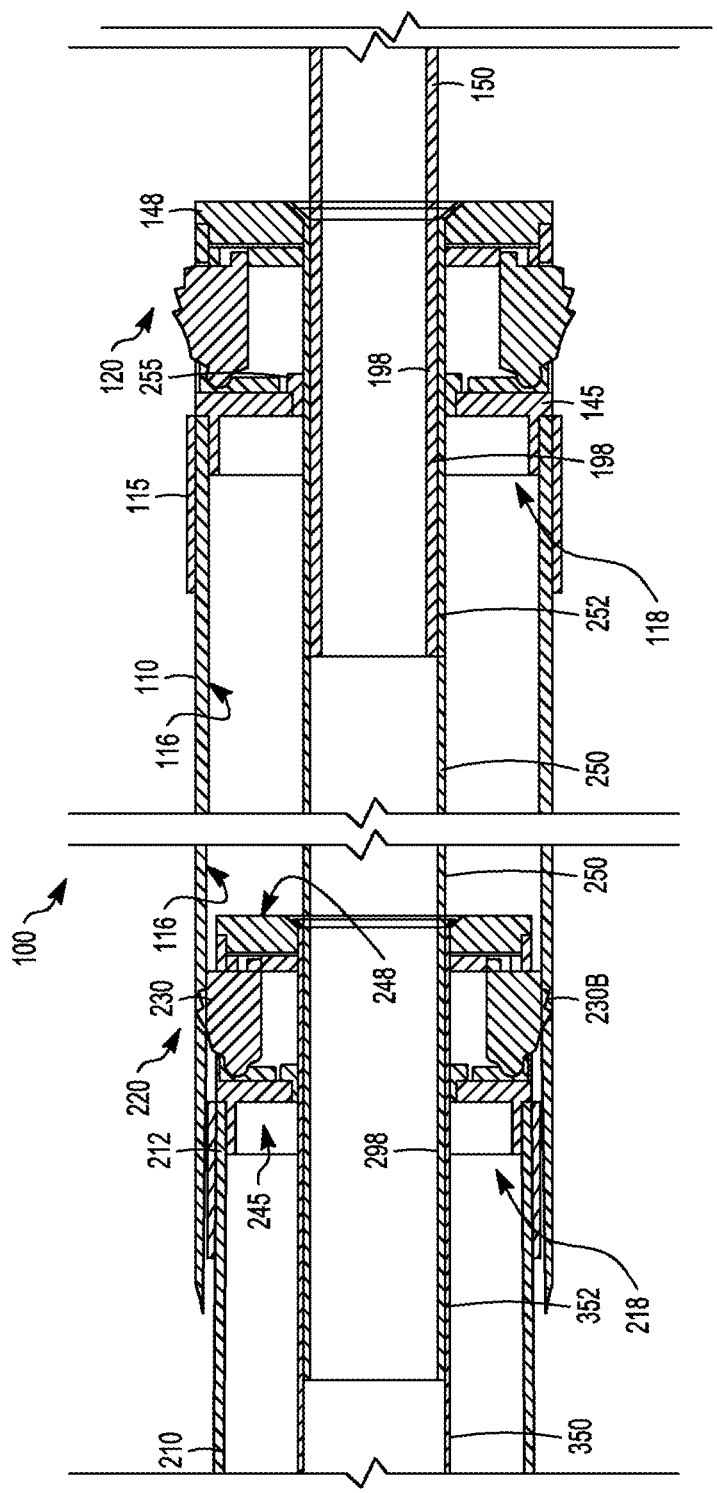
FIG. 4 is an expanded cross-sectional view showing a portion of the telescopic assembly shown in FIG. 3 in an extended (telescoped out) condition.

Referring now to FIGS. 3 and 4, and in particular FIG. 4, the tube assembly 100 is shown in more detail. The actuating tube 150 is slidably movable within the locking assembly 120. Bush 115 eases motion of support tube 110 within support tube 60. The locking assembly 120 defines a cylindrical opening through which the actuating tube 150 and a further actuating tube 250 can pass through. The support tube 110 is adapted to internally telescopically receive a locking assembly 220 and a proximal end 212 of a corresponding support tube 210, the support tube 210 being another of the pluralities of support tubes shown in FIGS. 1 to 3.

The actuating tube 150 includes a distal end 198 adapted to externally telescopically receive a proximal end 252 of a corresponding actuating tube 250. The corresponding actuating tube 250 is another of the plurality of actuating tubes shown in FIGS. 1 to 3. Referring to FIG. 4, the actuating tube 250 is longitudinally fixed with respect to its surrounding support tube 110. More specifically, the proximal end 252 of the actuating tube 250 flares outwardly adjacent end cap 148, where it is rotatably joined thereto, thereby providing for positive retention of actuating tube 250 within support tube 110. Similarly, actuating tube 350 flares outwardly adjacent end cap 148, where it is rotatably joined thereto, thus positively retaining actuating tube 350 within support tube 210. The end cap 148 sits within the cam housing 145, as end cap 248 sits within cam housing 245. An actuating tube bush 255 is provided to facilitate free rotation of the actuating tube 250 with respect to the cam housing 145 and the support tube 110. A further example of an actuating tube bush is shown more clearly in the isometric view of FIG. 7. In FIG. 7, the actuating tube bush 355 is mounted around actuating tube 350. FIGS. 7A and 7B illustrate four internesting circular support tubes 110, 210, 310 and 410 each having a protruding lug 111, 211, 311 and 411 with lugs 111, 211, and 211 engaging slots 213, 313 and 413.

Figure 4A:
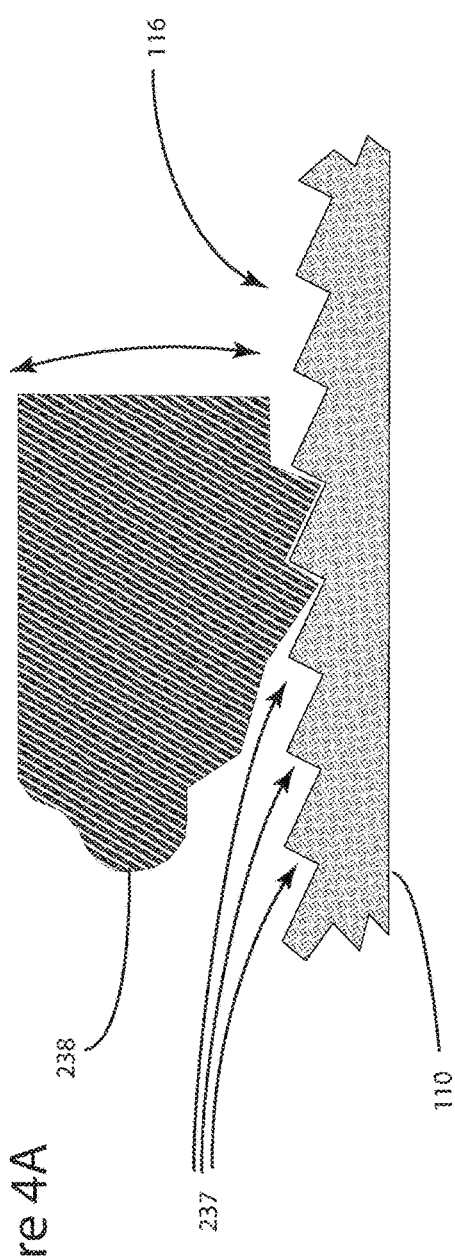
FIG. 4A is a close up view of a portion of the locking assembly illustrated in FIG. 4 in a locked position.
Figure 4B:
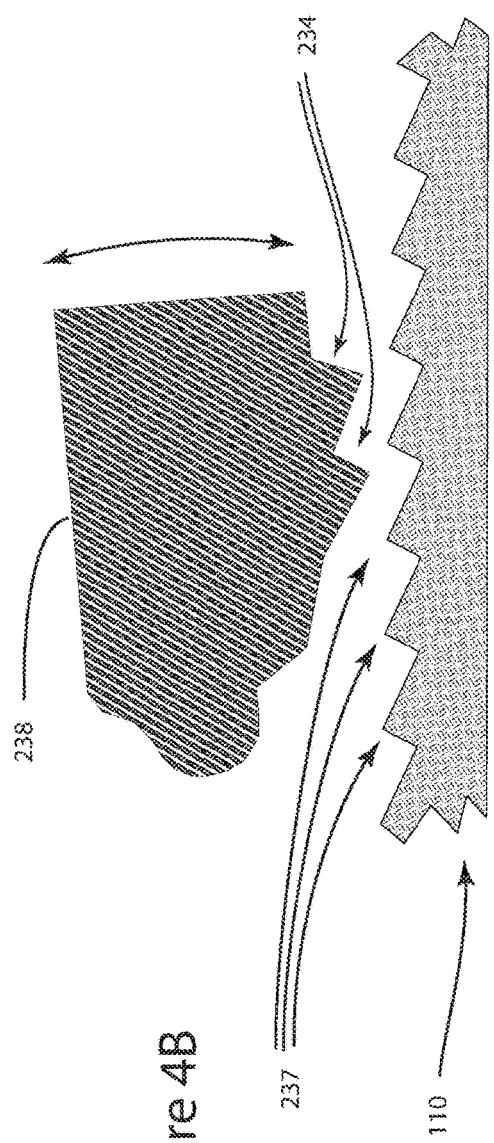
FIG. 4B is a close up view of a portion of the locking assembly illustrated in FIG. 4 in an unlocked position.

Returning to FIG. 4, a further locking assembly 220, disposed in an annulus 218 between the support tube 210 and the actuating tube 250 and the actuating tube 350 is also clearly shown. The depiction of the positions and shape of the clamps 230 and 230b in FIG. 4 are illustrative rather than being accurate drawings showing the compressed condition of the clamps against the inside surface 116 of the support tube 110. FIGS. 4A and 4B illustrate the action of cam follower 338 as it rotates into and out of engagement with support tube 110 bringing wall teeth 237 into and out of engagement with teeth 234 on cam follower 238.

Figure 5:
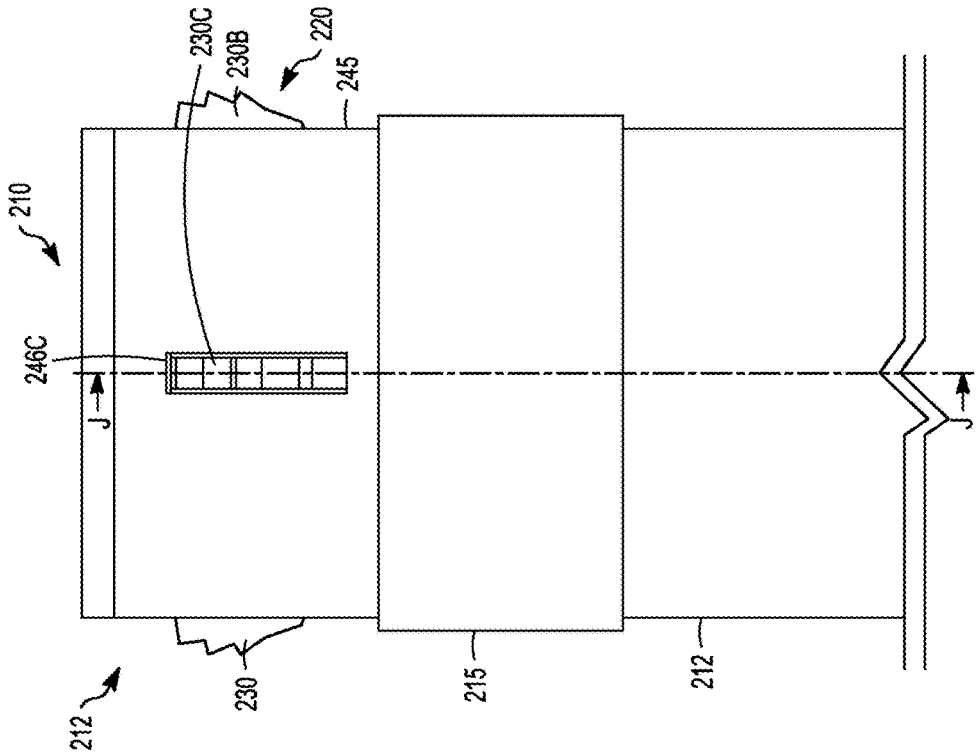
FIG. 5 is a side view of a proximal end of a support tube and locking assembly forming part of the telescopic assembly of FIGS. 1 to 4.

Referring now to FIG. 5, the proximal end 212 of the support tube 210 together with the locking assembly 220 shown in FIG. 4 is shown in a side view. FIG. 5 shows three of the four clamps 230, 230b and 230c that act on an inside surface 116 of a corresponding support tube 110, as is illustrated in FIG. 4. The clamps 230 and 230b are shown in more detail in FIGS. 6, 6A and 6B. In these figures, it can be seen that clamp 230 includes a clamp pivot 232 and clamp teeth 234. A cam follower 238 is, in this embodiment of the invention, integral with the clamp 230. In other embodiments, not shown, the cam follower component may be a separate component.

In many cases, there may be no need for the lowermost section of the telescopic leg to have an actuator rod extending throughout its length unless there is a desire to be able to activate the locking mechanisms from both the top and the bottom or to use twisting of the actuators to accomplish some action at the lowermost end of the telescopic leg, as to deploy and lock a foot on the telescopic leg simultaneously with locking of the leg sections in their respective positions or extend or withdraw a spike though a rubber foot, or the like.

FIG. 6A, on the left hand side, shows the clamp 230 in a locked position, the position in which it is disposed when locking the support tubes together. On the other hand, on the right hand side of FIG. 6A, clamp 230b is shown in an unlocked position.

Figure 6:
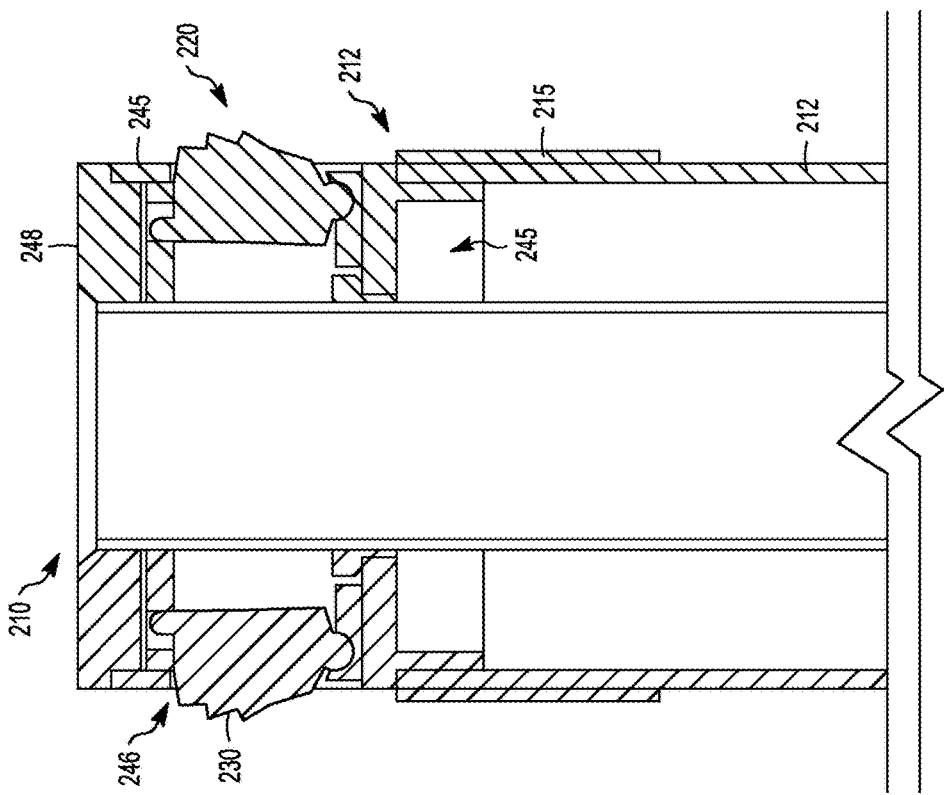
FIG. 6 is a cross-sectional view through section lines J-J shown on FIG. 5.
Figure 6D:
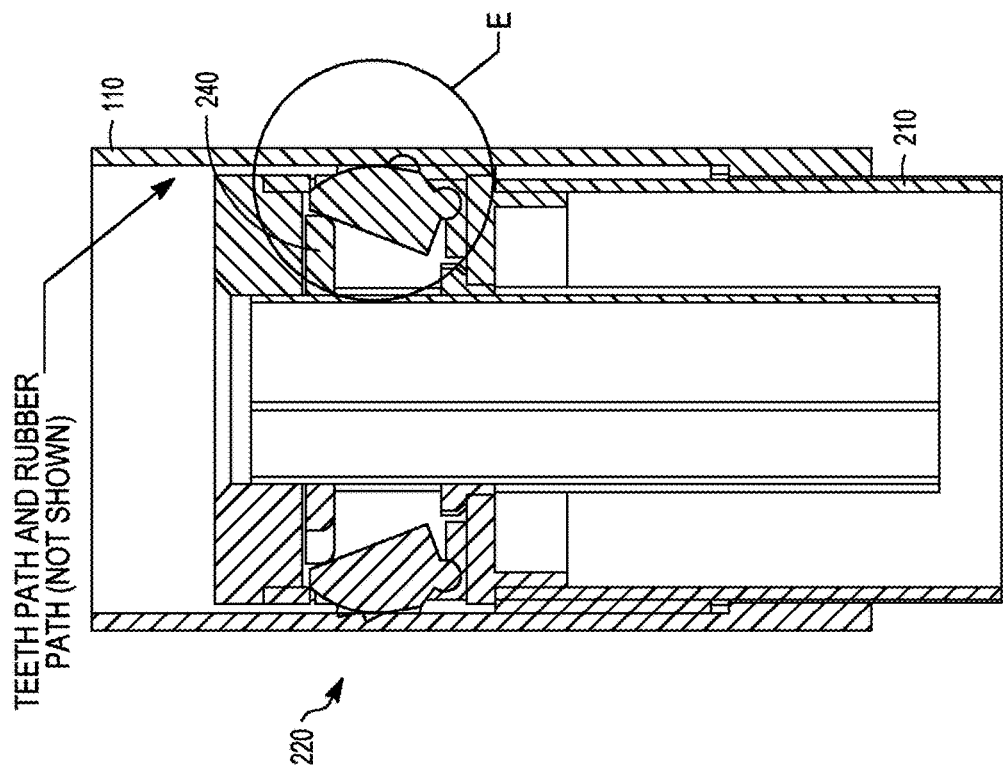
FIG. 6D is similar to that of FIG. 6B but shows an alternative locking assembly.
Figure 6C:
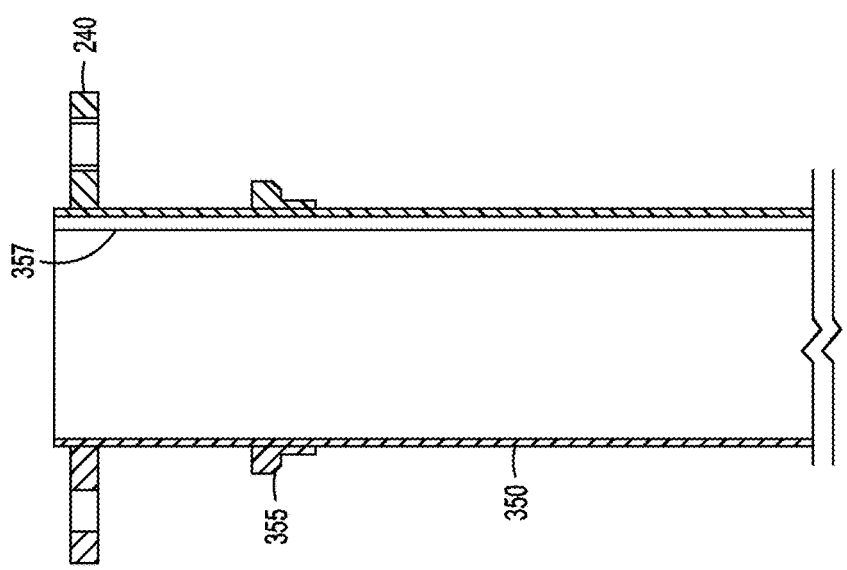
FIG. 6C shows a detailed view of a portion of an actuating tube and locking assembly shown in FIG. 6B.
Figure 6E:
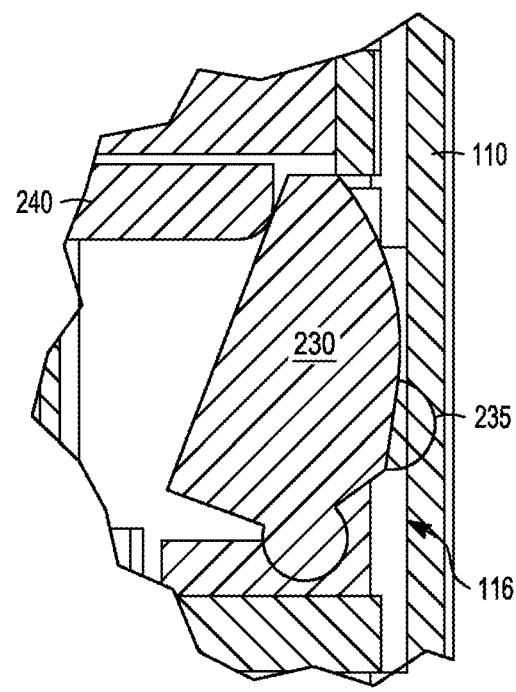
FIG. 6E is a close up view of the circled portion E shown in FIG. 6D.
Figure 6F:
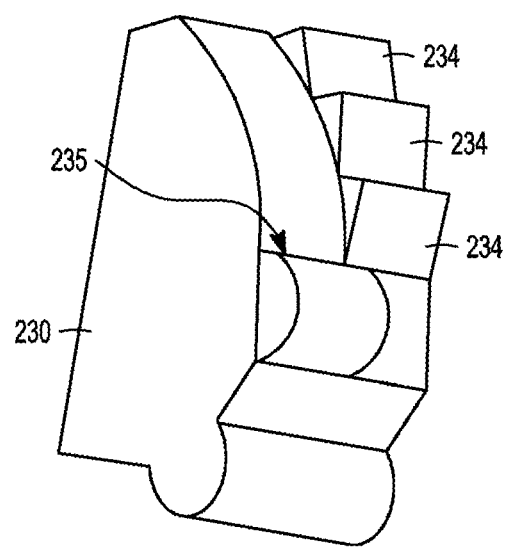
FIG. 6F is an isometric view showing a clamp of the locking assembly shown in FIGS. 6D and 6E.
Figure 12:
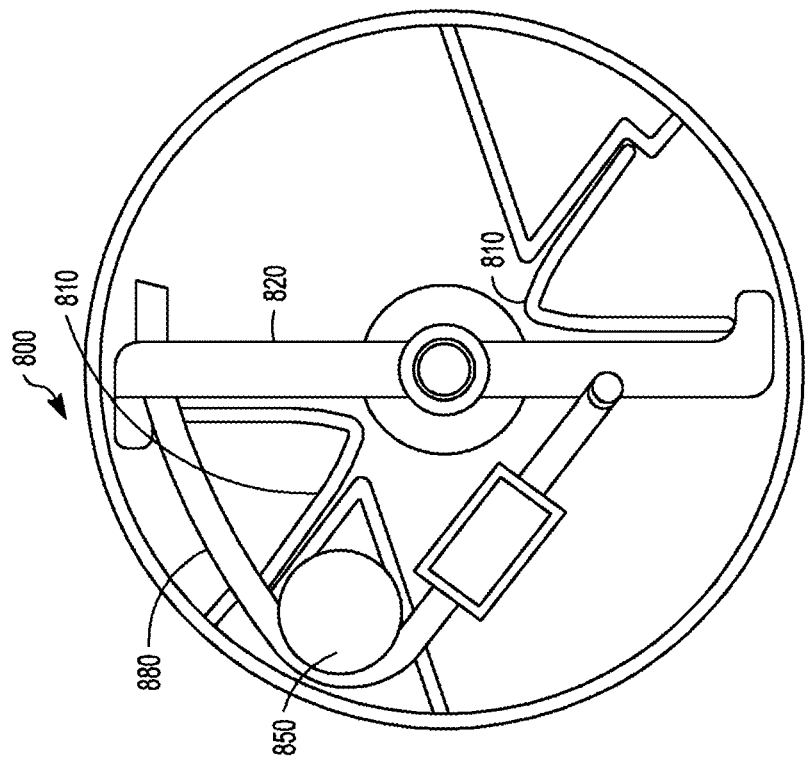
FIG. 12 is a top view of a mechanism for biasing and actuating the actuator tubes shown in FIG. 3.
Figure 11:
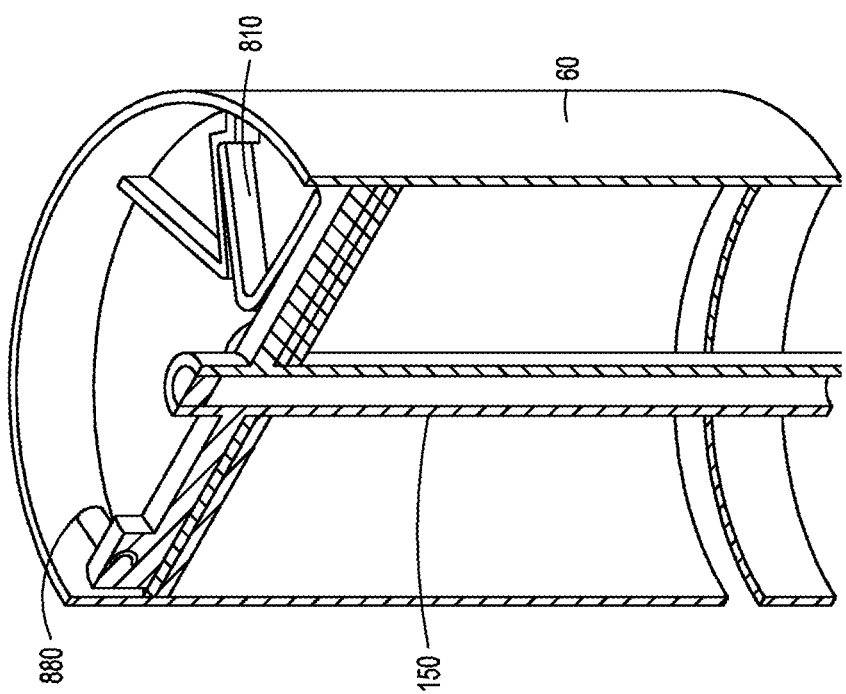
FIG. 11 shows the cross-sectional view taken through section lines J-J of FIG. 9, but in an isometric view.

Referring now to FIGS. 6D to 6F, an alternative locking assembly 220 is shown. With this locking assembly, the clamp 230, most clearly shown in the isometric view of FIG. 6F, includes a rubber foot 235 adjacent hard plastic teeth 234. FIG. 6E shows the rubber foot 235 in a locked position against the inside wall 116 of the support tube 110. FIG. 6E is diagrammatic only in its depiction of the rubber foot 235. In practice, the rubber foot 235 will be forced into a different shape as it bears against the inside surface 116 of the support tube 110.

The actuator 240, whether it be the actuator illustrated in FIGS. 6D to 6F, or the alternative actuator 240 shown in FIGS. 6A, 6B, 6C, 7 and 8, pushes the clamps 230 out to engage with the inside surface 116 of support tube 110. When the teeth 234 make contact with the corresponding teeth (not shown) within the inside surface 116, anti-clockwise rotation (looking from above) of the clamp 230 locking the support tube 110 and places lateral compression between support tube 110 and adjacent support tube 210.

With the arrangement described above, the larger the weight placed on the telescopic assembly 10, the greater the compression and locking ability. With the locking assemblies 220, when the lock is released, the rubber feet 235 pull upwards, plying the clamps off the inside surface 116 of the support tube 110, returning them inside the cam housing 245. With the embodiments shown in FIGS. 6A and 7, a more positive and direct deactivation of the clamps 230 is achieved through the action of the convex cam surface 242 or 142.

The teeth 234 of the clamp 230 may align with corresponding teeth 237 on an inside surface 116 of the support tube 110. The rubber foot a rubber path on an inside surface 116 of the support tube 110. The rubber feet 235 may align with a rubber path on an inside surface 116 of the support tube 110.

Now referring to FIG. 7, the cam 240 is shown in an isometric view. The cam 240 is fixed against rotation with respect to the actuating tube 350. Slots or keyways 357 are provided on the inside of the actuating tube 350. These slots or grooves correspond to a key or a ridge on the external surface of a corresponding actuating tube 250. In this way, relative rotation between tubes 250 and 350 can be constrained and torque can be transmitted from actuating tube 250 to the next actuating tube 350 and so on (refer to FIG. 3).

Referring again to FIGS. 5 and 6, the locking assembly 220 includes a cam housing 245. The cam housing 245 has four slots through which the clamps protrude. For instance, FIG. 5 shows clamp 230c protruding through slot 246c and FIG. 6 shows clamp 230 protruding through slot 246.

FIGS. 6 and 7 also show an annular bush 215 mounted to the proximal end 212 of the support tube 210. The annular bush provides a low friction interface between the support tube 210 and corresponding support tube 110, as is illustrated in FIG. 4.

The cam 240 shown in FIGS. 7 and 8 includes convex cam surface 242 and concave cam surface 244. These cam surfaces interact with the cam follower 238. In this way, rotation of the actuator tubes in an anti-clockwise direction when looking down into the view of FIG. 7, acts to push the cam follower 238 radially outwards about clamp pivot 232. This in turn pushes the clamp teeth 234 against the inside surface 116 of support tube 110. The same thing occurs with the other three clamps thereby locking the telescoping movement between support tube 110 and support tube 210. Simultaneously, all of the other locking assemblies are actuated, thereby locking each of the support tubes in place with a single actuating action. The actual number of clamps used for a particular telescopic assembly 10 will vary depending on the application.

At the proximal end 12 of the telescopic assembly 10, as generally indicated in FIG. 3, an actuator and biasing assembly 800 is provided as illustrated in FIGS. 9, 10, 11 and 12. FIG. 9 is a side view of an upper or proximal end 62 of support tube 60. Also shown in this view is a cable or wire 880. FIG. 10, a cross-sectional view taken through section lines J-J as indicated on FIG. 9, shows further elements of the actuator and biasing assembly 800. Specifically, this figure shows a rotating bar 820 operatively connected to actuating tube 150. The rotating bar 820 is connected to wire 880, as is most clearly shown in FIG. 12. A pair of parabolic springs 810 act to bias the rotating bar 820 and hence the actuating tube 150 towards a particular position. The telescopically arranged actuating tubes 150 through to 550 are mutually arranged in position together with corresponding locking assemblies 120 through to 520 such that the clamps (such as clamp 230 shown in FIG. 4) are biased towards an extended locking position against the inside of their respective support tubes. When the rotating bar is moved from the position shown in FIG. 12 in an anti-clockwise direction, for instance by tension being applied through cable 880, the locking assemblies move from a locked to an unlocked condition. In such an unlocked condition, an operator can readily extend or retract the plurality of support tubes.

While parabolic springs 810 are used in the embodiment shown in FIGS. 9 to 12, in other embodiments of the invention other suitable biasing arrangements, for instance torsion spring(s), may be employed.

Figure 14:
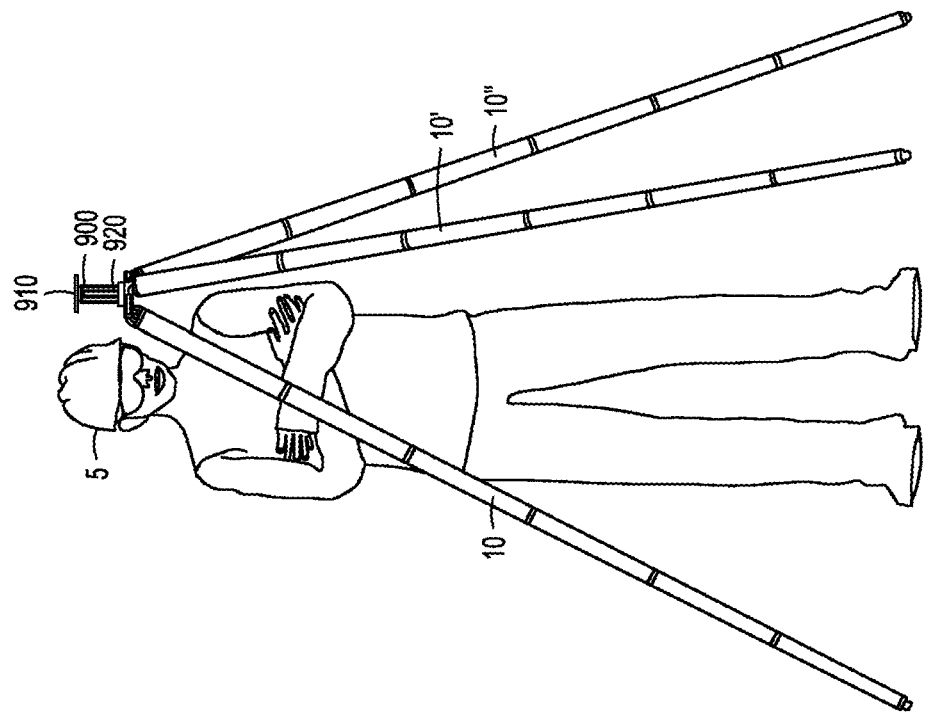
FIG. 14 shows the tripod of FIG. 13 in use in an extended (telescoped out) position.
Figure 13:
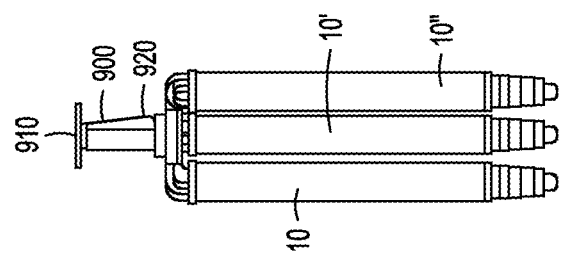
FIG. 13 shows three telescopic assemblies of the invention assembled into a tripod in a retracted (telescoped in) position.

FIGS. 13 and 14 show three telescopic assemblies 10, 10' and 10" according to the invention hinges together to form a tripod. In FIG. 13, the tripod is shown in a compacted or unextended position for transport, whereas in FIG. 14, it is shown in an extended condition for use. An actuating mechanism and mounting arrangement 900 is also shown in FIGS. 13 and 14. In the embodiment shown in FIGS. 13 and 14, a single actuating trigger 920 in the form of a button trigger is provided to actuate unlocking and locking of three telescopic leg assemblies simultaneously. A mounting plate 910 is provided to enable mounting of a camera or other.

Referring again to FIGS. 13 and 14, during set up of the tripod, the user may hold the camera or other equipment mounted to the mounting plate 910 at the top of the tripod in the desired position. The user can then simply squeeze the actuating trigger/button 920 to release the locks of support tubes forming the legs. The legs will then telescope to the ground under gravity. The user then releases the trigger/button 920 and each of the support tubes of all three legs lock. The user can then fine tune the level of the camera as desired. The user can also re adjust the height or configuration of the tripod with the press of just one trigger/button 920 and with only one hand.

With the embodiment of the invention shown in the drawings including FIGS. 13 and 14, the telescopic assemblies comprise six support tubes and five locking mechanisms. In other embodiments of the invention, different numbers of support tubes and associated locking mechanisms may be provided.

Figure 15:
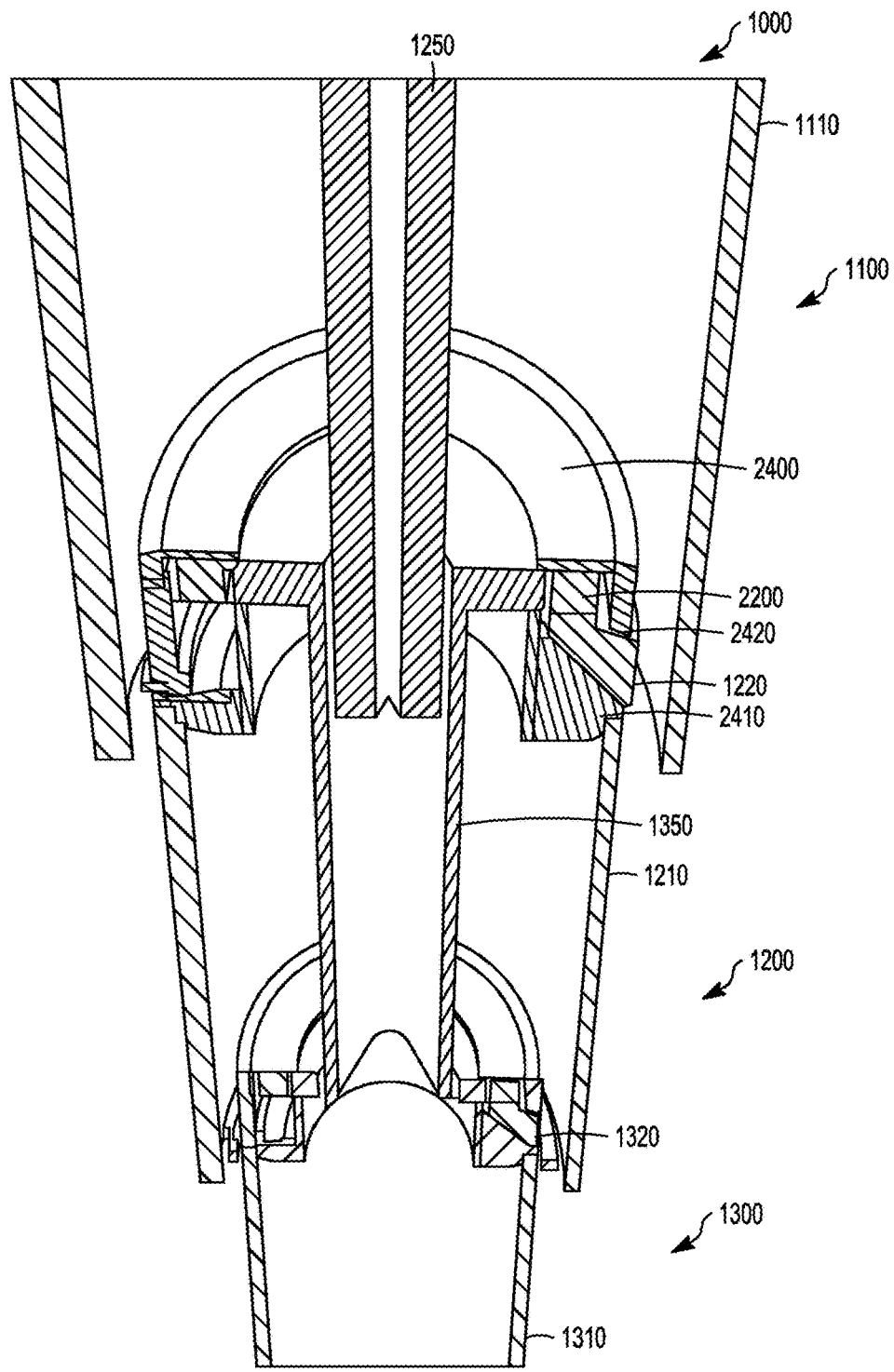
FIG. 15 shows a perspective cross-sectional view of a portion of another embodiment of a telescopic assembly according to the invention.
Figure 16:
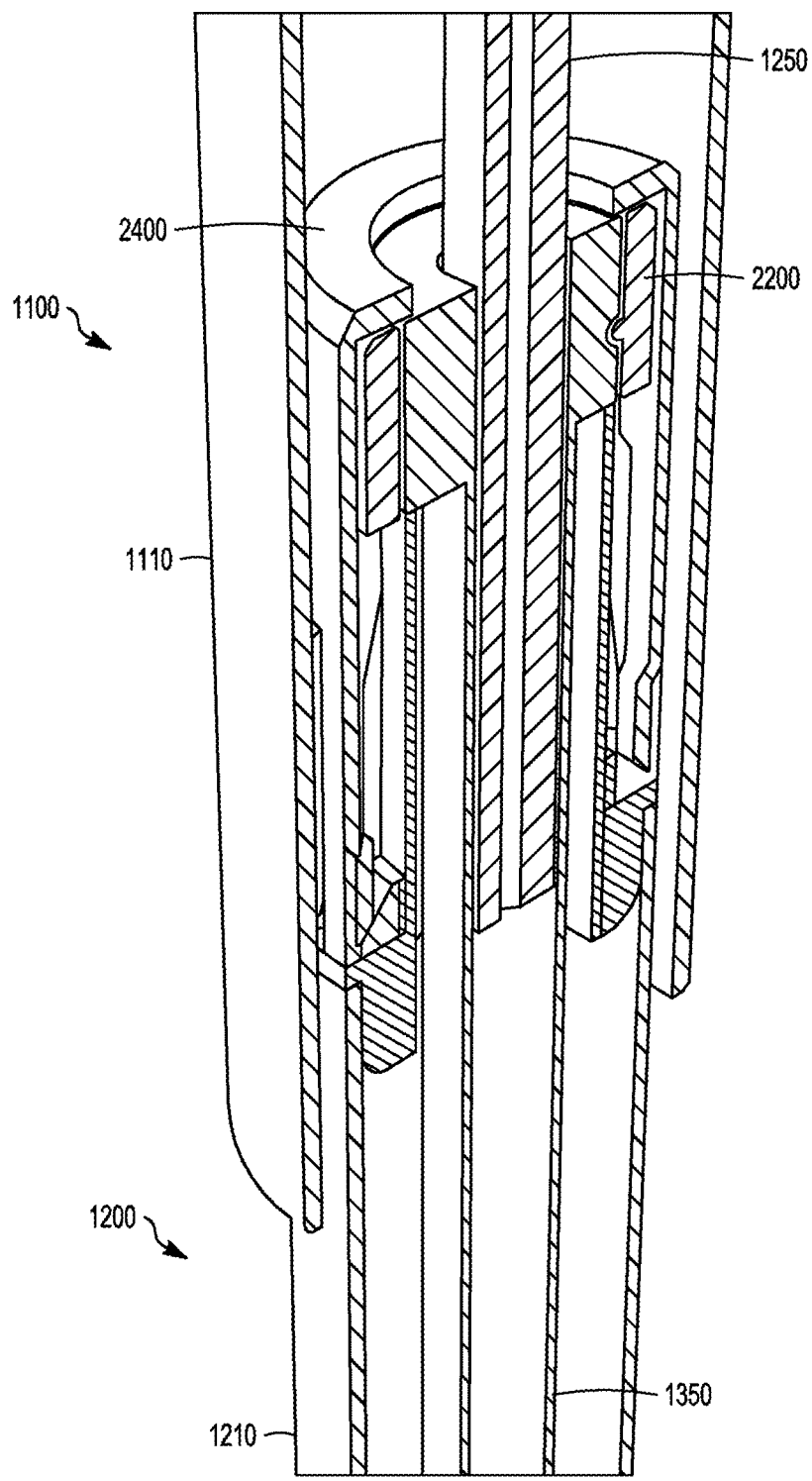
FIG. 16 shows a different perspective cross-sectional view of a locking assembly portion of the telescopic assembly illustrated in FIG. 15.

FIGS. 15 to 20 illustrate a further embodiment that applies similar principals with a slightly different internal working. FIGS. 15 and 16 illustrate a mid portion of a telescopic assembly 1000 including a plurality of telescopically arranged tube assemblies 1100, 1200, and 1300. Each tube assembly includes a support tube 1110, 1210, and 1310. Tube assemblies 1200 and 1300 each have a corresponding actuating tube 1250 and 1350 and a corresponding locking assembly 1220 and 1320 shown in FIG. 15. As FIG. 15 is illustrated in an extended position, the actuating tube 1250 and 1350 of the tube assemblies 1200 and 1300 is located substantially inside the previous tube assemblies 1100 and 1200, respectively.

Compared to preferred proportions, FIG. 15 is compressed along the longitudinal axis to show a plurality of tube assemblies, which are typically very long relative to their width, at once on a single page. FIG. 16 illustrates a single connection between tube assemblies 1100 and 1200 and FIG. 17 illustrates a single locking assembly in more detail with more preferred proportions.

Figure 17:
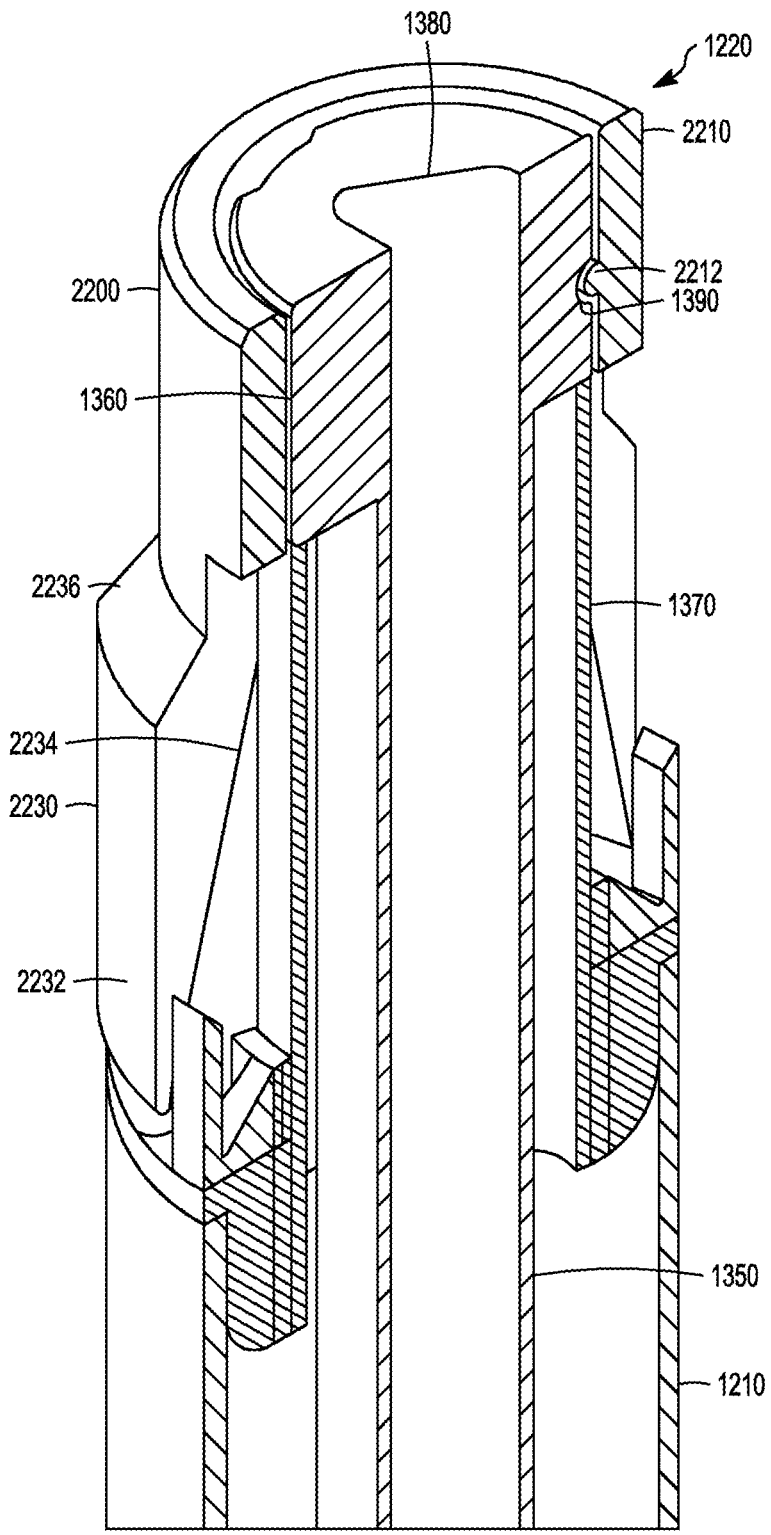
FIG. 17 shows a close up perspective cross-sectional view a locking assembly of the telescopic assembly illustrated in FIG. 15.

As seen most clearly in FIG. 17, the locking assembly 1220 comprises an integral cam follower and clamp member 2200 (illustrated individually in FIG. 18) which receives a head portion 1360 of the actuating tube 1350. The integral cam follower and clamp member 2200 has a cam follower portion 2210 and a clamp member portion 2230. It will be appreciated that a separate cam follower and clamp member may be provided instead of the integral cam follower and clamp member 2200 but, in general, it is considered that a single integral piece is preferable to reduce overall complexity and manufacturing cost.

Also seen most clearly in FIG. 17, the actuating tube 1350 has a shaft portion 1370 which extends from the head portion 1360. The actuating tube 1350 has a shaped channel 1380 that is adapted to receive a similarly shaped shaft portion of a preceding actuating tube 1250 (as shown in FIG. 15). The channel 1380 is non-circular in shape such that rotation of the preceding actuating tube 1250 imparts torque and rotates actuating tube 1350 as well. In the illustrated embodiment the channel 1380 is substantially triangular with rounded corners, but it will be appreciated that other non-circularly shaped channels 1380, including keyed circular channels, could be utilised to provide the same effect.

The cam follower portion 2210 of the integral cam follower and clamp member 2200 has a protrusion in the form of a ridge 2212. The ridge 2212 is received by a cam recess 1390 located in the actuating tube 1350. The cam recess corresponds at least partially in shape to the ridge 2212. Due to the helical nature of the ridge 2212 and cam recess 1390, rotation of the actuating tube 1350 is translated into a linear movement of the integral cam follower and clamp member 2200 along the axial axis of the actuating tube 1350.

Figure 18:
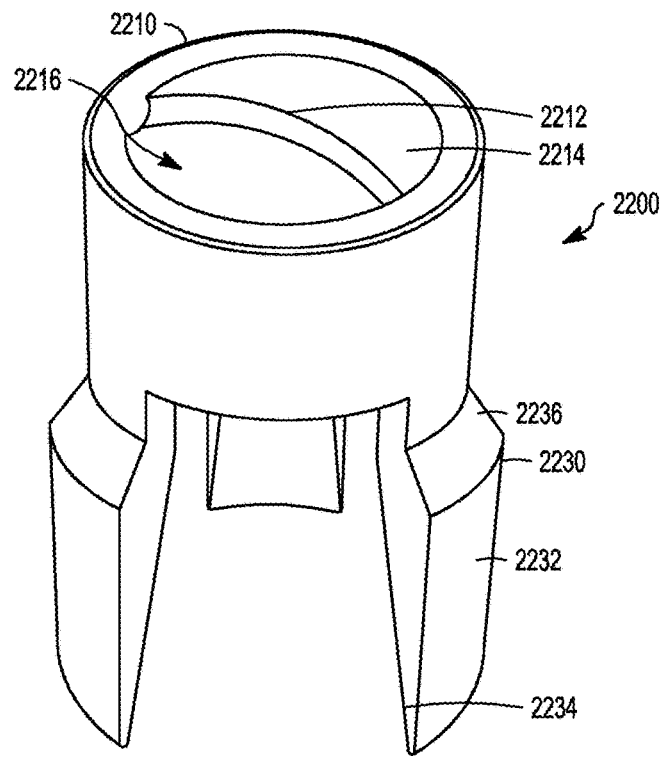
FIG. 18 shows a perspective view of an integral cam follower and clamp member according to the telescopic assembly illustrated in FIG. 15.

As seen in FIG. 18, in this embodiment the ridge 2212 is in the form of a helical ridge that traverses a portion of an inner surface 2214 of an opening 2216 of the cam follower portion 2210 of the integral cam follower and clamp member 2200. In the illustrated embodiment the opening 2216 is substantially cylindrical and is shaped to substantially correspond to the head portion 1360 of the actuating tube 1350 as illustrated in FIG. 17. As illustrated in FIG. 18, the integral cam follower and clamp member 2200 is adapted to fit inside a housing 2400.

The clamp member portion 2230 of the integral cam follower and clamp member 2200 has a plurality of clamp plates 2232. The clamp plates 2232 have a surface that substantially corresponds in shape to the inside of the respective tube assembly that receives the integral cam follower and clamp member 2200 (e.g. tube assembly 1110 as illustrated in FIG. 16).

The clamp plates 2232 have an inclined inner surface portion 2234 and an inclined outer surface portion 2236 that are both transverse to a longitudinal axis. As seen most clearly in FIG. 15, the inclined inner surface portion 2234 is shaped to engage with a downward angled wedge 2410 of the housing 2400 and the inclined outer surface portion 2236 is shaped to engage with a downward angled upper ramp 2420 of the housing 2400.

The relationship between the wedge 2410 of the housing 2400 and the inclined inner surface portion 2234 of the clamp member portion 2230 of the integral cam follower and clamp member 2200 is designed to translate downward, longitudinal movement of the integral cam follower and clamp member 2200 into outward perpendicular movement of the clamp plates 2232 as the two inclined surfaces bear against one another. Similarly, the relationship between the upper ramp 2420 of the housing 2400 and the inclined outer surface portion 2236 of the clamp member portion 2230 of the integral cam follower and clamp member 2200 is designed to translate upward, longitudinal movement of the integral cam follower and clamp member 2200 into inward perpendicular movement of the clamp plates 2232 as the two inclined surfaces bear against one another.

Figure 19:
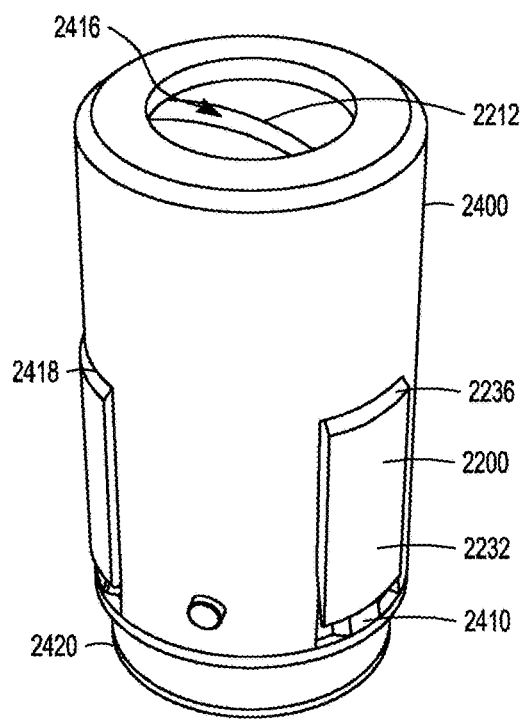
FIG. 19 shows a perspective view of the integral cam follower and clamp member of FIG. 18 located inside a housing.

As illustrated in FIG. 19, the housing 2400 has an aperture 2416 that corresponds to opening 2216 of the integral cam follower and clamp member 2200 to collectively define a bore therethrough. The housing 2400 also has cutouts 18 that correspond to the clamp plates 2232 of the clamp member portion 2230 of the integral cam follower and clamp member 2200. The cutouts are shaped to allow the clamp plates 2232 to extend radially from the housing 2400 for engagement with an inner surface of a respective tube assembly. As illustrated most clearly in FIGS. 15 to 17, the housing 2400 also has a tube mount 2420 adapted to mount the housing 2400 into an end of a tubular assembly. This mount 2420 could be threaded, or the like, for fastening the housing 2400 to a tubular assembly.

Figure 20:
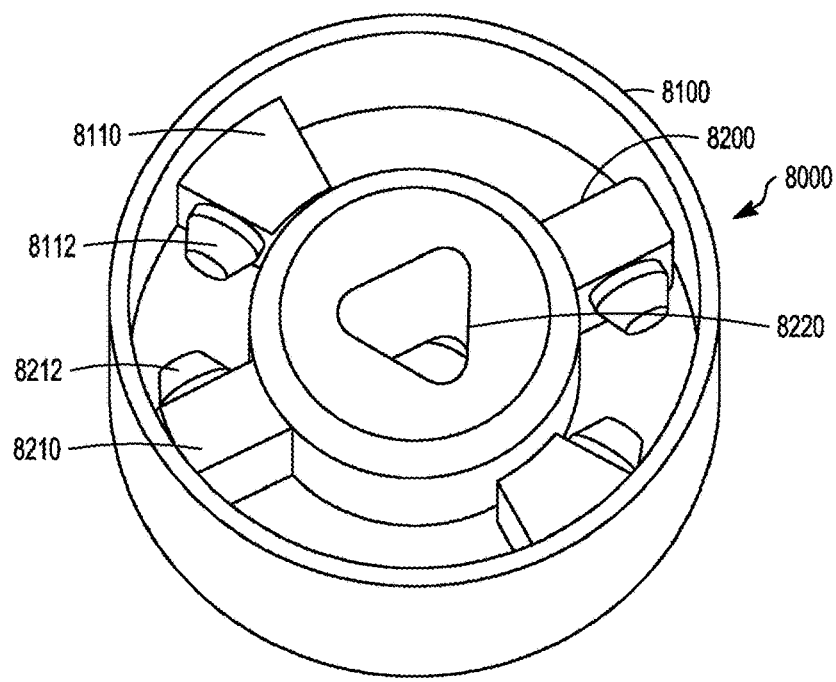
FIG. 20 shows a perspective view of a portion of a biasing assembly.

FIG. 20 illustrates a bias assembly 8000 a stator 8100 and a rotor 8200. The stator 8100 has two stops 8110 and the rotor has two stops 8120. The stator stops 8110 have each a stator boss 8112 and the rotor stops 8210 each have a rotor boss 8212 arranged in an opposing configuration. A biasing member (not shown) in the form of a spring, e.g. a helical coil spring, can be located between the stator boss 8112 and rotor boss 8212 to bias the rotor 8200 relative to the stator 8100. In the illustrated embodiment, the rotor 8200 is biased anti-clockwise, such that the spring resists clockwise rotation force. The rotor 8200 has an aperture 8220 which corresponds to the shape of the actuating tube shafts such that the biasing member can receive, and bias, the actuating tubes 1250, 1350.

Figure 21:
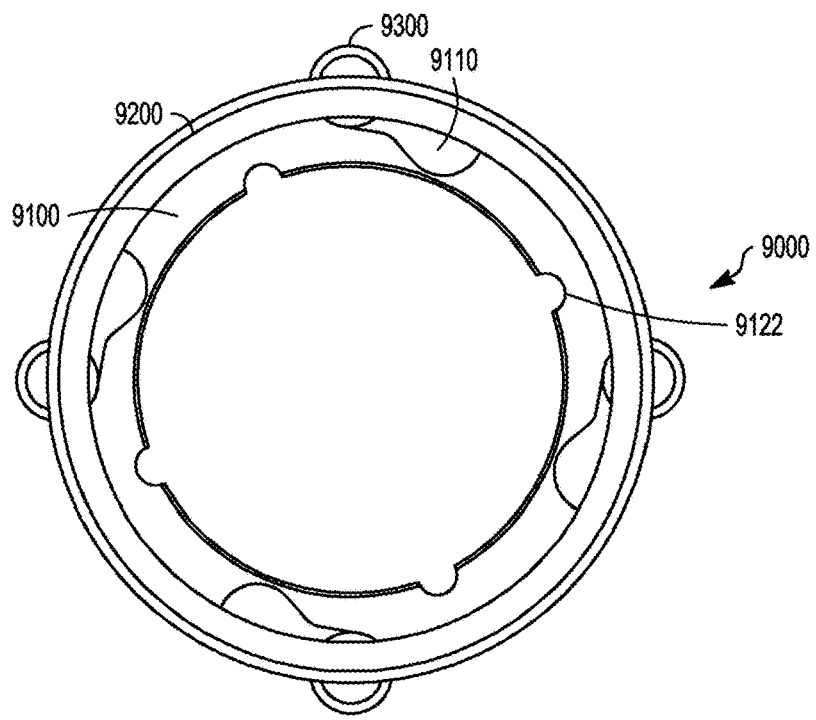
FIG. 21 illustrates a plan view of an alternative cam, cam follower, and clamp assembly using ball bearings.

FIG. 21 illustrates an alternative cam, cam follower, and clamp assembly 9000. This alternative design has a cam member 9100 coaxially located within a housing 9200. The cam member 9100 has cam recesses 9110 that are shaped to receive ball bearings 9300. In this embodiment the ball bearings 9300 effective act as cam followers inside the cam recesses 9110 of the cam member 9100. As the cam member 9100 is rotated relative to the housing 9200, the ball bearings 9300 follow the cam recesses 9110 which, due to their shape, translate the rotational movement of the cam member 9100 into radial movement of the ball bearings 9300. The ball bearings can, furthermore, also be used as clamp members by engaging directly with an inner surface of a tube assembly.

In this embodiment the cam member 9100 has a circular aperture 9120 which is keyed with recesses 9122 to allow torque to be transferred from a correspondingly shaped actuating assembly received therein (not shown).

FIGS. 22 to 27 illustrate a further embodiment that applies similar principals but again with a slightly different internal working. The main differences to the embodiment illustrated in FIGS. 15 to 20 will be described. Where appropriate, numbering consistent with the previous embodiment has been applied.

Figure 22:
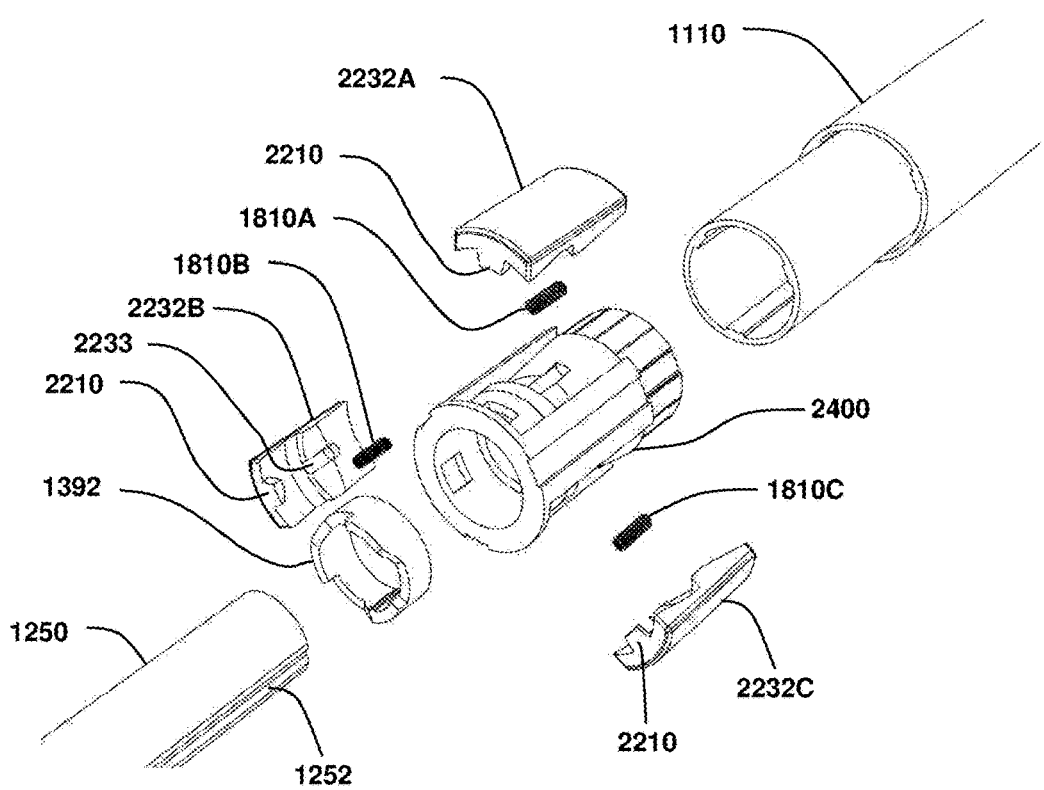
FIG. 22 illustrates an exploded perspective view of a portion of an alternative assembly.
Figure 23:
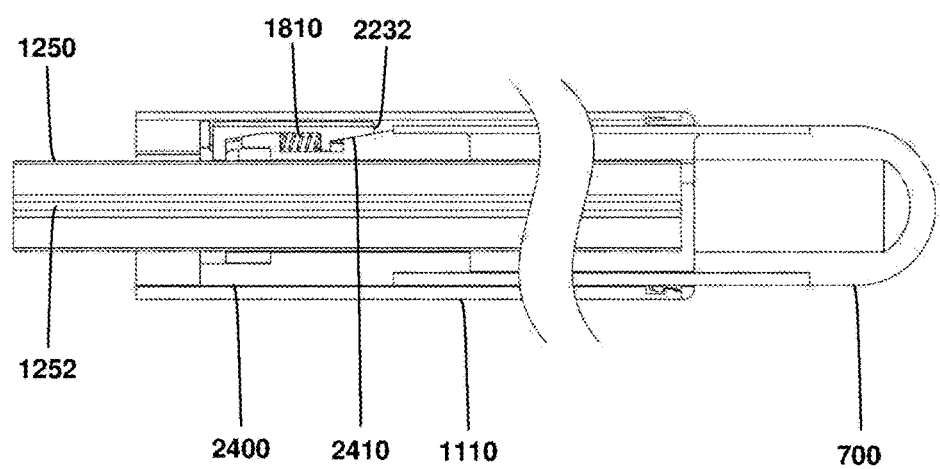
FIG. 23 illustrates a cross sectional view of a portion of the assembly illustrated in FIG. 22.

As seen most clearly in FIG. 22, there are three separate clamp plates 2232A, 2232B, and 2232C. Each plate has an integral cam follower portion in the form of a cam follower protrusion 2210 that engages with a cam 1392 having inclined surfaces configured to translate rotational movement of the cam into linear movement of the cam follower protrusion 2210.

Each clamp plate 2232A, 2232B, and 2232C has a respective biasing member in the form of a spring 1810A, 1810B, and 1810C. Each spring 1810A, 1810B, and 1810C is located in a respective notch 2233 of the clamp plates 2232A, 2232B, and 2232C (visible in relation to clamp plate 2232B in FIG. 22). The springs 1810A, 1810B, and 1810C bias the clamp plates 2232A, 2232B, 2232C so that they are under tension and keep the cam follower protrusion 2210 in engagement with the inclined surfaces of the cam 1392.

Figure 24:
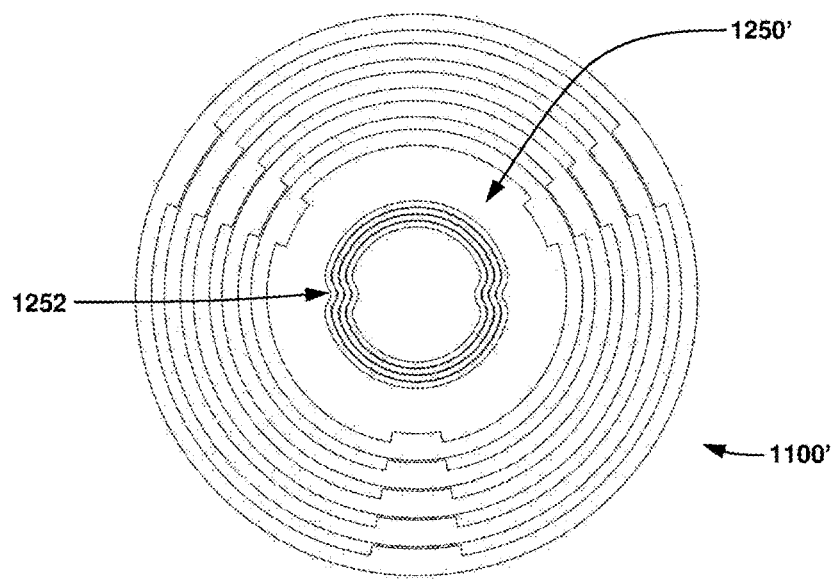
FIG. 24 illustrates a cross sectional view across nested tubes of the assembly illustrated in FIG. 22.
Figure 25:
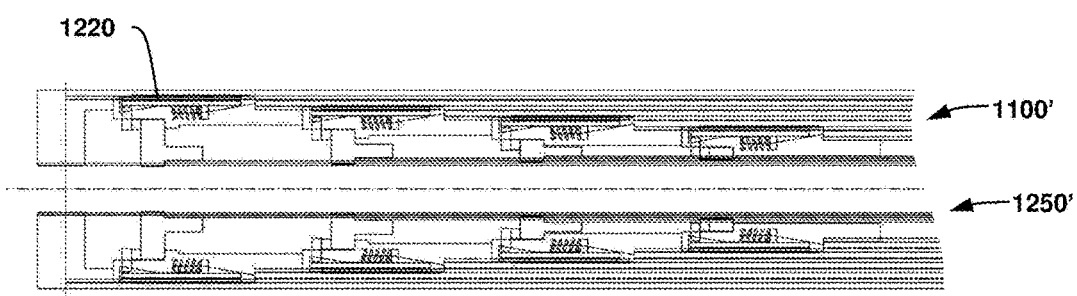
FIG. 25 illustrates cross sectional view of nested locking assemblies of the assembly illustrated in FIG. 22.

As illustrated in FIG. 24, the support tubes 1100' and actuating tubes 1250' nest tightly. The actuating tubes 1250' in this embodiment are generally circular with two keyed recesses 1252 which ensures adjacent actuating tubes are not rotatable with respect to one another.

Figure 26:
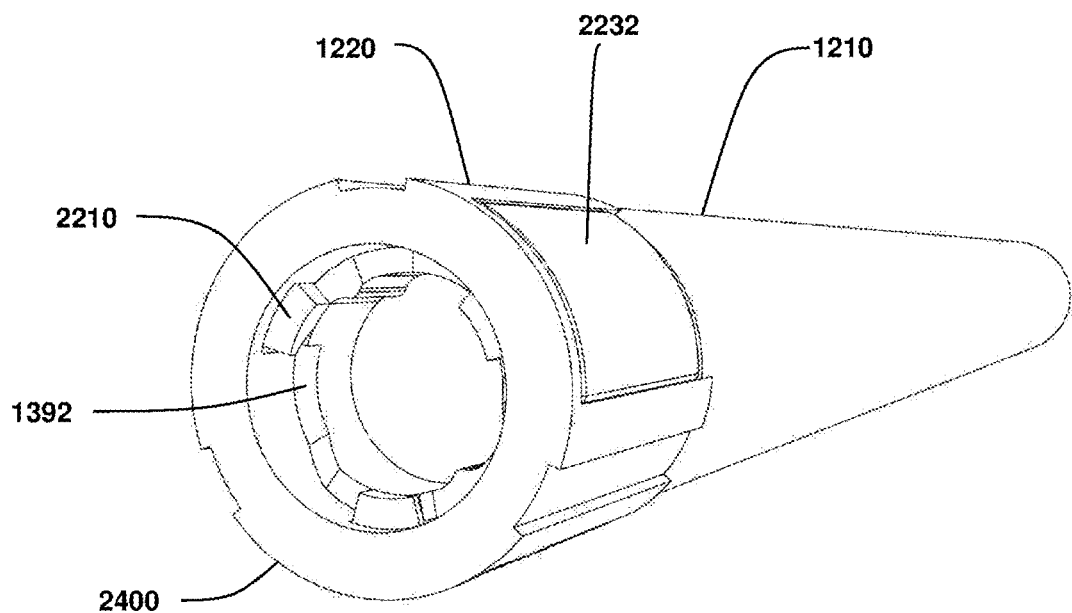
FIG. 26 illustrates a perspective end view of a support tube and locking assembly in an unlocked position.
Figure 27:
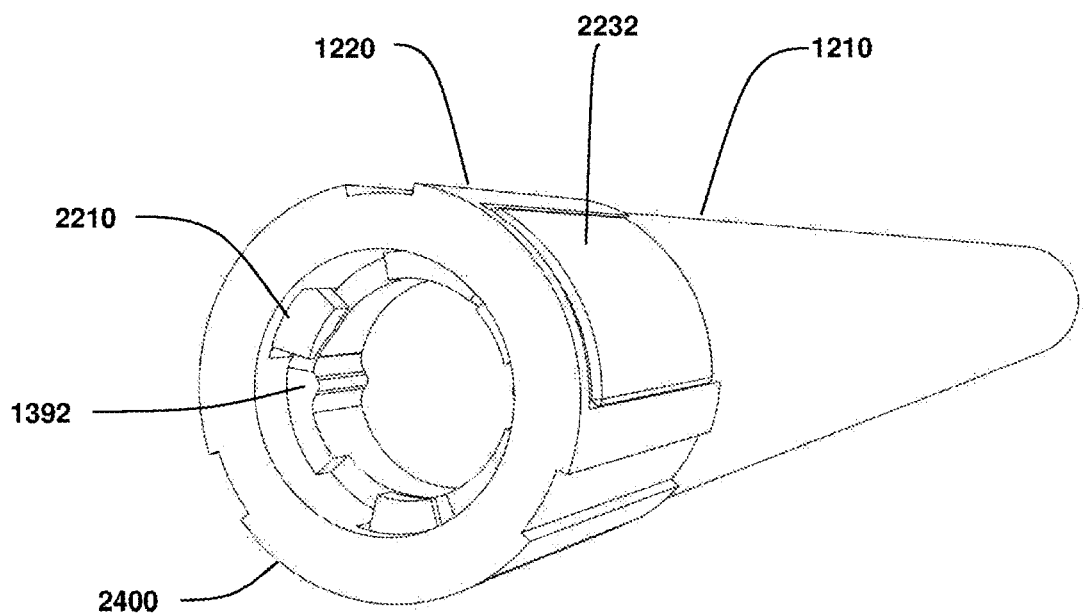
FIG. 27 illustrates a perspective end view of an a support tube and locking assembly in a locked position.

FIG. 26 illustrates the locking assembly 1220 in an unlocked position where the clamp plates 2232A, 2232B, and 2232C are retracted, and FIG. 27 illustrates the locking assembly 1220 in a locked position where the clamp plates 2232A, 2232B, and 2232C are extended.

The clamp plates 2232A, 2232B, and 2232C are configured to be moved by rotation of the cam 1392 such that the cam followers 2210 slide along the inclined surfaces, under tension from their springs, to raise and lower the clamp plates 2232A, 2232B, and 2232C such that they in turn slide along wedge 2410 (seen most clearly in FIG. 23) and extend outwardly, as illustrated in FIG. 27, to engage with an inner surface of an adjacent support tube (not shown in FIG. 26 or 27 for clarity).

In use, the telescopic assembly 1000 illustrated in FIGS. 15 to 20 operates in a very similar manner to the telescopic assembly 100 illustrated in FIGS. 1 to 14. In a portable, storage position the telescopically arranged tube assemblies 1100, 1200, and 1300 and corresponding actuating tubes 1250 and 1350 are nested within each other. At rest, the biasing assembly 8000 imparts torque to the actuating tubes 1250 and 1350.

The rotational force of the actuating tubes 1250 and 1350 is transferred to the integral cam follower and clamp member 2200 via the cam recesses 1390 and cam follower ridges 2212. Due to helical shape of the cam recesses 1390 and cam follower ridges 2212, the rotational force is translated to a linear force along the axial axis of the actuating tubes 1250 and 1350.

In the illustrated embodiment, a clockwise force from the biasing assembly 8000 imparts a downward force on the integral cam follower and clamp member 2200. Due to the inclined inner surface portion 2234, the clamp plates 2232 are forced outwards such that an outer surface of the clamp plates 2232 engages with an inner surface of a support tube 1110, 1210, and 1310. The clamp plates 2232 frictionally engage with the inner surface of a support tube 1110, 1210, 1310 and prevent relative movement therebetween.

Due to the angle of inclination of the inclined inner surface portion 2234 and downward angled wedge 2410 of the housing 2400, any forces applied along the longitudinal axis of the support tube 1110, 1210, 1310 increases the outward force applied by the clamp plates, further strengthening the grip between the two parts.

When a user wants to vary (e.g. extend of retract) the arrangement of the telescopically arranged tube assemblies 1100, 1200, and 1300, they can activate the actuator, preferably through depressing a trigger, which rotates the actuating tubes 1250 and 1350 against the bias force from the bias assembly 8000 which, in the illustrated embodiment, is counterclockwise. This imparts an upward force on the integral cam follower and clamp member 2200.

Due to the inclined outer surface portion 2236, the clamp plates 2232 are urged inwards such that an outer surface of the clamp plates 2232 disengages from the inner surface of a support tube 1110, 1210, and 1310 allowing relative movement therebetween. Additionally, the integral cam follower and clamp member 2200 is also preferably resiliently flexible such that the clamp plates 2232 also tend inwards once they clear the downward angled wedge 2410 of the housing 2400.

Generally telescopic supports, such as tripod legs, require many steps to lock each segment. The embodiment of the invention described here provides telescopic legs (or arms) that are lockable with one movement of a single actuator rotating the telescoping actuating tubes. One of the features of the mechanical arrangement that achieves this is the internal telescopic torsional actuator formed by the internal actuating tubes 150, 250, 350, 450, 550. The external support tubes 110, 210, 310, 410, 510 (legs) and internal actuating tubes 150, 250, 350, 450, 550 telescope in opposite directions. With the embodiment of the invention described herein, the telescopic assembly can be locked at any point of extension. Furthermore, releasing and locking of multiple support tubes occurs simultaneously from a single actuation point at a proximal end adjacent to the operator.

Advantageously, the invention saves considerable time compared to individually unlocking and locking each telescopic tube segment every time you want to extend or collapse the assembly. In the case of a camera tripod, it is common to have 3 to 5 telescopic segments per leg, which can result in 6 to 12 individual locks that need to be opened and closed separately. Appreciably this is a fiddly and time consuming process.

Furthermore, by simultaneously actuating all segments at once, tripods using the telescopic assembly have a self levelling effect by relying on gravity to extend the legs until they hit the ground which, if the tripod is held level when actuated, are at the heights required to provide a level tripod. This further reduces the time to set up a tripod, or the like, as it is very quick and easy to get a substantially level tripod in a single action. Depending on the application, fine tuning may be required which can optionally be provided by a suitable mount, e.g. a camera tripod head, or the like, depending on the application.

In the embodiment illustrated in FIGS. 17 to 20, the parts are arranged such that compression loads along the longitudinal axis of the telescopic assembly 1000 increase the grip between adjacent tube assemblies when in the locked position. This increases strength in use and reduces the likelihood of lock failure.

Although illustrated embodiments of the telescopic assembly are primarily in relation to a tripod (e.g. a camera tripod, surveying tripod, or the like), it will be appreciated that the telescopic assembly can be used in relation to a variety of different applications. For example, it could be used as an elongate handle (e.g. for a monopod, bipod, boom mic, mop, window cleaning tool, or the like), as a stand (e.g. a music stand for holding sheet music, light stand, flash umbrella stand, or the like), or even as support members in the construction of a portable dwelling (e.g. a tent, gazebo, shade structure, or the like).

Due to the generally sealed nature of the telescopic assembly it may be able to be automatically, or at least semi-automatically, extended using a fluid, preferably compressed air, from a suitable source (e.g. a compressed air canister or compressor). Appreciably, the telescopic assembly may be automatically, or at least semi-automatically, retracted using a vacuum effect. These systems can further save time and effort required to extend or retract the telescopic assembly when required. The telescopic assembly may also be biased for automatic, or at least semi-automatic, retraction. In such a form, the telescopic assembly may be biased by an elastic member or tension spring located, for example, inside the support tubes.

Throughout the specification the term 'tube' is intended to mean any tubular form having any suitable cross sectional shape including, for example, regular shapes such as circular, triangular, square, hexagonal, or octagonal, or irregular shapes having protrusions, notches, keys, or the like.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The following claims are not intended to limit the scope of what may be claimed in any future patent applications based on the present application. Integers may be added to or omitted from the example claims at a later date so as to further define or re-define the invention.

The invention claimed is:

1. A telescopic assembly including a plurality of telescopically arranged tube assemblies, each tube assembly including:
   a support tube;
   a locking assembly mounted at or towards an end of the support tube; and
   an actuating tube operatively engaged with, and slidably movable within, the locking assembly;
   wherein the support tube is adapted to telescopically receive a further locking assembly and an end of a corresponding further support tube of another of the plurality of support tubes,
   wherein the actuating tube is adapted to telescopically receive an end of a corresponding further actuating tube of another of the plurality of actuating tubes; and
   wherein the support tubes and the actuating tubes telescope in opposite directions.

2. The telescopic assembly of claim 1, wherein the support tube internally telescopically receives a locking assembly and an end of a corresponding support tube of another of the plurality of support tubes and the corresponding actuating tube externally telescopically receives an end of a corresponding actuating tube of another of the plurality of actuating tubes.

3. The telescopic assembly of claim 1, wherein the actuating tubes have a non-circular cross section or are keyed with at least one notch and/or protrusion.

4. The telescopic assembly of claim 1, wherein each locking assembly includes a cam and a cam follower;
   wherein the cam or cam follower includes a ramp comprising one or more inclined surfaces and the cam follower or cam, respectively, includes a protrusion adapted to slide along at least a portion of the one or more inclined surfaces.

5. The telescopic assembly of claim 4, wherein each locking assembly includes at least one clamp actuatable by a respective cam follower;
   wherein the clamp is movable between an unlocked position and a locked position.

6. The telescopic assembly of claim 5, wherein at least a portion of the clamp is movable substantially outwardly from a longitudinal axis of the actuating tube.

7. The telescopic assembly of claim 5, wherein the clamp is configured such that it is movable along a longitudinal axis of the actuating tube by the cam, between the unlocked and locked positions, causing the clamp to engage with an adjacent inclined surface that moves a portion of the clamp perpendicularly to the longitudinal axis of the actuating tube.

8. The telescopic assembly of claim 5, wherein, in the locked position, the clamp engages an inside surface of the support tube.

9. The telescopic assembly of claim 1, further comprising an actuator operatively engaged with at least one actuating tube for rotating the actuating tubes about their axis.

10. The telescopic assembly of claim 9, further comprising a biasing assembly operatively engaged with the actuator.

11. The telescopic assembly of claim 10, wherein the biasing assembly comprises at least one spring.

12. The telescopic assembly of claim 11, wherein the biasing assembly comprises a plurality of springs, including at least one spring located in each locking assembly.

13. The telescopic assembly of claim 1, wherein when the telescopic assembly is extended, the diameter of each extendible support tube increases with respect to the proximally adjacent support tube in the telescopic assembly, while the diameter of each actuating tube decreases with respect to the proximally adjacent actuating tube in the telescopic assembly.

14. The telescopic assembly of claim 1, wherein when the telescopic assembly is extended, the diameter of each extendible actuating tube increases with respect to the proximally adjacent actuating tube in the telescopic assembly, while the diameter of each support tube decreases with respect to the proximally adjacent support tube in the telescopic assembly.

15. The telescopically assembly of claim 1, wherein the support tubes are hindered from rotating relative to other support tubes.

16. A method of arranging a telescopic assembly comprising a plurality of telescopically arranged tube assemblies including at least one support tube assembly and at least one actuating tube assembly wherein the support tube assembly and the actuating tube assembly telescope in opposite directions, the method comprising the steps of:

activating a single actuator;

releasing the plurality of telescopically arranged tube assemblies, such that they can move longitudinally relative to each other, in response to the actuator being activated;

extending at least one telescopically arranged support tube assembly and at least one oppositely telescopically arranged actuating tube assembly;

deactivating the single actuator; and locking the plurality of telescopically arranged tube assemblies, such that they cannot move longitudinally relative to each other, in response to the actuator being deactivated.

17. A telescopically extendible leg comprising:
a) a head block;
b) a linearly extendible first plurality of nested tubes, one of the tubes being joined to the head block;
c) a linearly extendible second plurality of nested tubes arrayed within the first plurality of nested tubes;
d) a plurality of rotary cams and radially extending cam followers each mounted proximate an end of one of at least two tubes in the first plurality of nested tubes,
e) each of the cam followers being extendible to engage against a surface of one of the first plurality of nested tubes at one position of the cam followers relative to the surface of the cam and retractable at another position relative to the surface of the cam; and
f) an actuator for rotating the cams and the cam followers relative to each other and withdrawing the cam followers inwardly by rotating the second plurality of nested tubes relative to the first plurality of nested tubes.

18. The telescopically extendible leg of claim 17, wherein the cam and cam followers are biased relative to each other to bias the cam followers toward the extended position.

19. The telescopically extendible leg of claim 17, wherein when the telescopically extendible leg is extended, the diameter of each extendible tube in one linearly extendible plurality of tubes increases with respect to the proximally adjacent tubes in that linearly extendible plurality of tubes, while the diameter of each extendible tube in the other linearly extendible plurality of tubes decreases with respect to the proximally adjacent tube in that linearly extendible plurality of tubes.

20. The telescopically extendible leg of claim 17, wherein the tubes in both linearly extendible pluralities of tubes are hindered from rotating relative to other tubes in the same linearly extendible plurality of tubes.

* * * * *